US012789242B2

(12) United States Patent
Huff et al.

(10) Patent No.: US 12,789,242 B2
(45) Date of Patent: Nov. 10, 2026

(54) MANIFOLD FLOOD VALVE ASSEMBLY

(71) Applicant: Delaware Capital Formation, Inc., Downers Grove, IL (US)

(72) Inventors: Randy Huff, Lynchburg, OH (US); Richard E. Haas, Milford, OH (US)

(73) Assignee: Delaware Capital Formation, LLC, Downers Grove, IL (US)

( * ) Notice: Subject to any disclaimer, the term of this patent is extended or adjusted under 35 U.S.C. 154(b) by 87 days.

(21) Appl. No.: 19/012,221

(22) Filed: Jan. 7, 2025

(65) Prior Publication Data

US 2026/0192340 A1 Jul. 9, 2026

(51) Int. Cl.

*B08B 9/032* (2006.01)
*A47L 15/44* (2006.01)

(Continued)

(52) U.S. Cl.

CPC ............ *B08B 9/032* (2013.01); *D06F 39/022* (2013.01); *F16K 15/063* (2013.01); *A47L 15/449* (2013.01); *B08B 2209/032* (2013.01)

(58) Field of Classification Search

CPC . B08B 9/032; B08B 2209/032; D06F 39/022; D06F 33/02; D06F 2204/02; F16F 15/063; G05D 11/00; G05D 11/02; F04B 43/1253; F04B 43/1276; A47L 15/449; A47L 15/4418; A47L 15/4463; A47L 2401/023

(Continued)

(56) References Cited

U.S. PATENT DOCUMENTS

| | | | |
|---|---|---|---|
| 3,120,326 A | 2/1964 | Hedeman | |
| 5,259,557 A | 11/1993 | Spriggs et al. | |

(Continued)

FOREIGN PATENT DOCUMENTS

| | | |
|---|---|---|
| CN | 104170811 A | 12/2014 |
| CN | 104170811 B | 5/2016 |

(Continued)

OTHER PUBLICATIONS

International Search Report and Written Opinion in International Appln. No. PCT/US2025/060375, mailed on Apr. 17, 2026, 14 pages.

(Continued)

*Primary Examiner* — David J Walczak

(74) *Attorney, Agent, or Firm* — Fish & Richardson P.C.

(57) ABSTRACT

Systems and methods for dispensing chemicals include a flush manifold including multiple intake ports and an outlet port. An eductor includes an inlet port fluidically coupled to a source of a diluent, a pickup port fluidically coupled to a source of a chemical product, a discharge port fluidically coupled to an intake port of the flush manifold and configured to discharge a chemical solution, and a venturi fluidically coupled to each of the inlet port, the pickup port, and the discharge port. The venturi is configured to draw the chemical product into the eductor in response to the diluent being coupled to the inlet port to form the chemical solution. A check valve is fluidically coupled to the outlet port of the flush manifold and arranged to maintain the flush manifold substantially full of fluid between dispensing operations. A vent valve fluidically coupled to an outlet of the check valve.

20 Claims, 15 Drawing Sheets

(51) Int. Cl.
*D06F 39/02* (2006.01)
*F16K 15/06* (2006.01)

(58) Field of Classification Search
USPC .................. 222/559, 54, 643, 651, 652, 214
See application file for complete search history.

(56) References Cited

U.S. PATENT DOCUMENTS

| | | | |
|---|---|---|---|
| 6,571,824 B2 | 6/2003 | Jones et al. | |
| 6,634,376 B2 | 10/2003 | Haas | |
| 7,487,795 B2 | 2/2009 | Sand | |
| 8,813,789 B2 | 8/2014 | Dalhart, Sr. | |
| 8,926,834 B2 | 1/2015 | West et al. | |
| 8,956,579 B2 | 2/2015 | Yankee et al. | |
| 9,447,536 B2 | 9/2016 | Tincher et al. | |
| 10,877,491 B2 | 12/2020 | Tincher et al. | |
| 11,660,646 B2 * | 5/2023 | Faris, Jr. | B08B 9/0328 141/5 |
| 11,891,741 B2 | 2/2024 | Tincher et al. | |
| 12,191,518 B2 * | 1/2025 | Hickey | H01M 50/317 |
| 2003/0034078 A1 | 2/2003 | Haas | |
| 2009/0065065 A1 | 3/2009 | Sand | |
| 2010/0024896 A1 | 2/2010 | Dalhart | |
| 2010/0024916 A1 | 2/2010 | Dyer | |
| 2013/0200097 A1 | 8/2013 | Yang | |
| 2018/0080952 A1 | 3/2018 | Lehtonen et al. | |
| 2019/0079543 A1 | 3/2019 | Tincher et al. | |
| 2021/0132635 A1 | 5/2021 | Tincher et al. | |
| 2024/0200255 A1 | 6/2024 | Tincher et al. | |

FOREIGN PATENT DOCUMENTS

| | | |
|---|---|---|
| WO | WO 200185320 A2 | 11/2001 |
| WO | WO 2007034304 A1 | 3/2007 |
| WO | WO 2010110796 A1 | 9/2010 |
| WO | WO 2014078750 A1 | 5/2014 |

OTHER PUBLICATIONS

U.S. Appl. No. 15/689,255, filed Aug. 29, 2017, Tincher.

[Guide] HydroChem 919 “Multifunction Proportioning and Dispensing System”, 2006, Rev B 01/06, 2 pages.

[Manual] Hydro User Manual FM-800 Flush Manifold, HYD10098686, 2017, Rev A 05/17, 4 pages.

Extended European Search Report in European Appln. No. 18193882.0, mailed on Jun. 3, 2019, 8 pages.

* cited by examiner

MANIFOLD FLOOD VALVE ASSEMBLY

TECHNICAL FIELD

This disclosure relates to chemical dispensing systems, e.g., dispensing systems for commercial laundry systems.

BACKGROUND

One problem with dispensing systems is that chemical residue can build up within and on the outer surfaces of such systems. In particular, chemicals that are oxidizers tend to crystalize within and on the outside of dispenser flush manifolds. FIGS. 13 and 14 illustrate this problem. FIG. 13 is a photograph showing crystallization residue 1305 built up on the outside of piping surfaces of a dispenser flush manifold 1300. FIG. 14 is a photograph showing crystallization residue 1305, 1310 built up on both the inside and outside of piping of the flush manifold 1300. This may be a particular problem in dispensing systems that have a vent or air gaped component upstream of (or in other fluid communication with) the flush manifold. Such may be the case with dispensing systems that employ eductors.

Improvements to chemical dispensing systems are desirable to reduce or eliminate such oxidation residue.

SUMMARY

In general, innovative aspects of the subject matter described in this specification include a flush manifold flood valve assembly. The flush manifold flood valve assembly functions to reduce or eliminate oxidation residue from chemicals. In particular, the flush manifold valve assembly described herein can prevent or reduce incursion of air into dispensing system flush manifolds. This, consequently, reduces the amount of oxygen available for oxidation with chemical residues that may remain present after flushing operations.

In an example implementation, a dispensing system includes a flush manifold including a plurality of intake ports and an outlet port. The system includes an eductor that includes an inlet port fluidically coupled to a source of a diluent, a pickup port fluidically coupled to a source of a chemical product, a discharge port fluidically coupled to an intake port of the flush manifold and configured to discharge a chemical solution, and a venturi fluidically coupled to each of the inlet port, the pickup port, and the discharge port. The venturi is configured to draw the chemical product into the eductor in response to the diluent being coupled to the inlet port such that the chemical product is mixed with the diluent to form the chemical solution. A check valve is fluidically coupled to the outlet port of the flush manifold and arranged to maintain the flush manifold substantially full of fluid between dispensing operations, and a vent valve is fluidically coupled to an outlet of the check valve.

In an aspect combinable with the example implementation, the vent valve includes a vent check valve arranged to permit ambient airflow into the dispensing system downstream of the check valve.

In another aspect combinable with one, some, or all of the previous aspects, the vent check valve includes an umbrella valve or a ball check valve.

In another aspect combinable with one, some, or all of the previous aspects, the check valve includes a plug assembly. The plug assembly includes a valve plate; and a spring positioned between the plug assembly and the valve plate.

The plug assembly is free to move linearly along a central axis of the check valve against a force of the spring.

In another aspect combinable with one, some, or all of the previous aspects, the valve plate includes a central opening surrounded by an annular wall. The annular wall serves to retain the spring in a position along the central axis.

In another aspect combinable with one, some, or all of the previous aspects, the valve plate includes a plurality of apertures arranged circumferentially around the valve plate and radially outward of the annular wall.

In another aspect combinable with one, some, or all of the previous aspects, the apertures include an elongated shape.

In another aspect combinable with one, some, or all of the previous aspects, the plug assembly includes a cage comprising an outer cylinder connected to an inner cylinder by a front face. The inner cylinder surrounds a central aperture defined in the front face. A plug includes a stem extending from a rear surface of the plug. The stem extends through the central aperture of the front face and into the inner cylinder of the cage, and an O-ring is captured between the plug and the cage.

In another aspect combinable with one, some, or all of the previous aspects, the spring is positioned against the front face of the cage, the outer cylinder at least partially surrounds the spring, and the spring at least partially surrounds the inner cylinder.

In another aspect combinable with one, some, or all of the previous aspects, the outer cylinder includes a plurality of apertures.

In another aspect combinable with one, some, or all of the previous aspects, the inner cylinder extends through a central aperture of the valve plate with the check valve in a closed position.

In another aspect combinable with one, some, or all of the previous aspects, the inner cylinder extends through a central aperture of the valve plate with the check valve in an open position.

In another aspect combinable with one, some, or all of the previous aspects, the plug assembly includes a plug including a plug body with two planar surfaces opposite one another with a groove formed between the planar surfaces, a stem extending from the plug body, and an O-ring captured within the groove.

In another aspect combinable with one, some, or all of the previous aspects, the check valve includes a first body portion forming a check valve inlet, and a second body portion coupled to the first body portion, the second body portion forming a check valve outlet. The valve plate is secured between a shoulder region of the second body portion and a plate seat of the first body portion.

In another aspect combinable with one, some, or all of the previous aspects, the second body portion includes a connection port, and the vent valve is coupled to the connection port.

In another aspect combinable with one, some, or all of the previous aspects, the plug assembly is housed within the first body portion.

In another example implementation, a dispensing system includes an inlet manifold including an inlet port and a plurality of outlet ports. The inlet port of the inlet manifold is fluidically coupled to a source of a diluent. A flush manifold includes a plurality of intake ports and an outlet port. The dispensing system includes a plurality of eductors. Each eductor includes an inlet port, a pickup port, a discharge port, and a venturi fluidically coupled to each of the inlet port, the pickup port, and the discharge port. The inlet port of each eductor is fluidically coupled to an outlet port of the inlet manifold. The pickup port of each eductor is fluidically coupled to a source of a chemical product, and the discharge port of each eductor is fluidically coupled to an intake port of the flush manifold. A check valve is fluidically coupled to the outlet port of the flush manifold and arranged to maintain the flush manifold substantially full of fluid between dispensing operations, and a vent valve is fluidically coupled to an outlet of the check valve.

In an aspect combinable with the example implementation, the vent valve includes a vent check valve arranged to permit ambient airflow into the dispensing system downstream of the check valve.

In another aspect combinable with one, some, or all of the previous aspects, the check valve includes a plug assembly; a valve plate; and a spring positioned between the plug assembly and the valve plate. The plug assembly is free to move linearly along a central axis of the check valve against a force of the spring.

In another example implementation, a dispensing system includes a flush manifold including a plurality of intake ports and an outlet port. The dispensing system includes an eductor including an inlet port fluidically coupled to a source of a diluent, a pickup port fluidically coupled to a source of a chemical product, a discharge port fluidically coupled to an intake port of the flush manifold and configured to discharge a chemical solution, and a venturi fluidically coupled to each of the inlet port, the pickup port, and the discharge port. The venturi is configured to draw the chemical product into the eductor in response to the diluent being coupled to the inlet port such that the chemical product is mixed with the diluent to form the chemical solution. A check valve is fluidically coupled to the outlet port of the flush manifold and arranged to maintain the flush manifold substantially full of fluid between dispensing operations. A vent valve is fluidically coupled to an outlet of the check valve. The check valve includes a first body portion forming a check valve inlet, and a second body portion coupled to the first body portion, the second body portion forming a check valve outlet. The check valve includes a plug assembly housed within the first body portion. The plug assembly includes a plug including a plug body with two planar surfaces opposite one another with a groove formed between the planar surfaces, a stem extending from the plug body, and an O-ring captured within the groove. A valve plate is secured between the second body portion and the first body portion. The valve plate includes a central opening surrounded by an annular wall. The stem of the plug extends through the central opening. A plurality of apertures is arranged circumferentially around the valve plate and radially outward of the annular wall, and a spring positioned between the plug assembly and the valve plate. The plug assembly is free to move linearly along a central axis of the check valve against a force of the spring.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
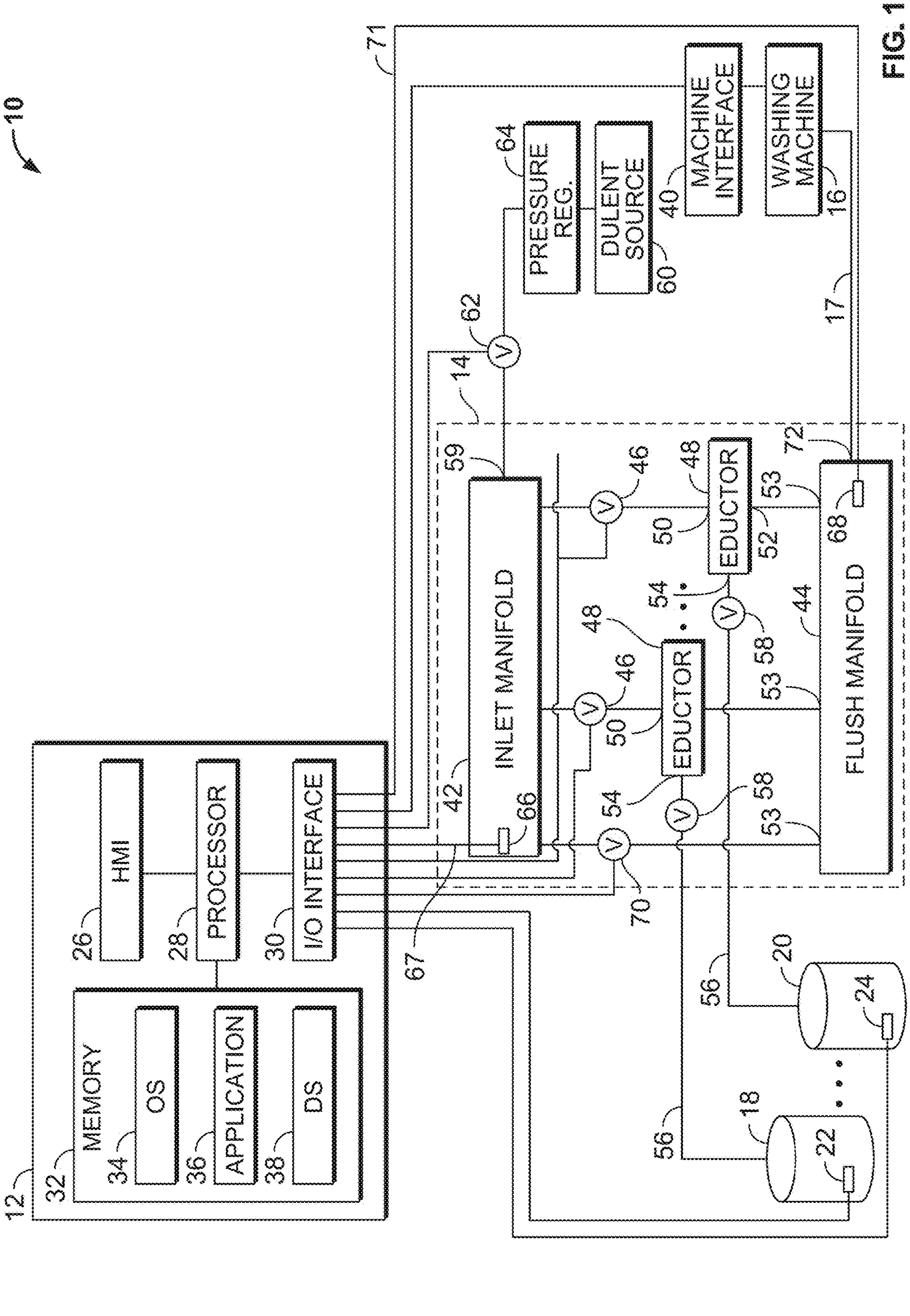
FIG. 1 depicts a block diagram of an operating environment of an exemplary dispensing system.

FIG. 1 depicts an exemplary operating environment for a dispensing system 10. The dispensing system 10 includes a controller 12 and a dispenser 14 and is configured to dispense chemical solutions to a point of use, such as a washing machine 16, through a dispense line 17. The operating environment of the dispensing system 10 can include one or more sources of a chemical product 18, 20 that are fluidically coupled to the dispenser 14.

Exemplary chemical products 18, 20 can include chemicals such as detergents, water softening agents, bleaches, and the like. Each source of chemical product 18, 20 can include a level sensor 22, 24 that provides a signal indicative of a level of chemical product 18, 20 remaining in the source to the controller 12.

The controller 12 can include a Human Machine Interface (HMI) 26, a processor 28, an input/output (I/O) interface 30, and a memory 32. The HMI 26 can include output devices, such as an alphanumeric display, a touch screen, and/or other visual and/or audible indicators that provide information from the processor 28 to a user of the dispensing system 10. The HMI 26 can also include input devices and controls, such as an alphanumeric keyboard, a pointing device, keypads, pushbuttons, control knobs, etc., capable of accepting commands or input from the user and transmitting the entered input to the processor 28.

The processor 28 can include one or more devices configured to manipulate signals (analog or digital) based on operational instructions that are stored in memory 32. Memory 32 can be a single memory device or a plurality of memory devices including but not limited to read-only memory (ROM), random access memory (RAM), volatile memory, non-volatile memory, static random-access memory (SRAM), dynamic random-access memory (DRAM), flash memory, cache memory, or any other device capable of storing information. Memory 32 can also include a mass storage device (not shown), such as a hard drive, optical drive, tape drive, non-volatile solid state device or any other device capable of storing digital information.

Processor 28 can operate under the control of an operating system 34 that resides in memory 32. The operating system 34 can manage controller resources so that computer program code embodied as one or more computer software applications 36 (such as a dispensing operation application) residing in memory 32 can have instructions executed by the processor 28. In an alternative implementation, the processor 28 can execute the applications 36 directly, in which case the operating system 34 can be omitted. One or more data structures 38 can also reside in memory 32, and can be used by the processor 28, operating system 34, and/or application 36 to store data.

The I/O interface 30 operatively couples the processor 28 to other components in the operating environment, such as the dispenser 14, washing machine 16, and level sensors 22, 24. The I/O interface 30 can include signal processing circuits that condition incoming and outgoing signals so that the signals are compatible with both the processor 28 and the components to which the processor 28 is coupled. To this end, the I/O interface 30 can include analog to digital (A/D) and/or digital to analog (D/A) converters, voltage level and/or frequency shifting circuits, optical isolation and/or driver circuits, and/or any other analog or digital circuitry suitable for coupling the processor 28 to the other components in the operating environment.

The I/O interface 30 can be coupled to the washing machine 16 by a machine interface 40. The machine interface 40 can be configured to transform high voltage trigger signals generated by the washing machine 16 into lower voltage signals suitable for the I/O interface 30 of controller 12 and transmit these low voltage trigger signals to the controller 12. The signals can be transmitted over one or more dedicated signal lines, e.g., using a multi-conductor cable, or over a signal serial data line. For implementations using a serial data line to communicate with the controller 12, the machine interface 40 can further include a processor, a memory in communication with the processor, and a user interface that enables programing of the machine interface 40 to translate trigger signals into a suitable serial communication protocol. Machine interfaces are described in U.S. Pat. No. 9,447,536, the disclosure of which is incorporated by reference herein in its entirety.

The dispenser 14 can include an inlet manifold 42, a flush manifold 44, and one or more selector valves 46. Each selector valve 46 can selectively fluidically couple the inlet manifold 42 to an inlet port 50 of a respective eductor 48 in response to a signal received from the controller 12. In addition to the inlet port 50, each eductor 48 can further include a discharge port 52 fluidically coupled to an intake port 53 of the flush manifold 44, and a pickup port 54 fluidically coupled to a feed line 56 from one of the one or more sources of chemical product 18, 20. In some implementations, one or more of the pickup ports 54 can be coupled to the feed line 56 by a check valve 58 to prevent a back-flow from the flush manifold 44 into the source of chemical product 18, 20.

The inlet port 50 can be coupled to the discharge port 52 by one or more passages that are configured to produce suction at the pickup port 54 in response to a flow of diluent through the eductor 48. The eductor 48 can operate by forcing the diluent through a conical body that creates a pressure differential between the inlet port 50 and discharge port 52. This pressure differential can generate a vacuum inside the eductor 48 that, in turn, generates suction at the pickup port 54.

The inlet manifold 42 can include an input port 59 that is coupled to a source of diluent 60 by an inlet valve 62 and/or a pressure regulator 64. The pressure regulator 64 can regulate the pressure of the diluent 60 provided to the inlet manifold 42. The inlet valve 62 can be configured to selectively couple the inlet manifold 42 to the source of diluent 60 in response to signals from the controller 12. The pressure regulator 64 can be configured to maintain the pressure of the diluent 60 in the inlet manifold at a constant level so long as the pressure provided by the source of diluent 60 remains above a minimum level.

The pressure of the diluent 60 in the inlet manifold 42 can affect the rate at which diluent 60 flows through the eductors 48. By isolating the inlet manifold 42 from variations in diluent pressure provided by the source of diluent 60, the pressure regulator 64 can reduce variances in the concentration of solutions provided to the point of use. For example, regulating the pressure of the diluent can prevent solutions provided to the point of use from being “leaned out” beyond their desired concentration levels by excessive diluent flow levels through the eductors 48.

The dispenser 14 can further include a pressure sensor 66 located downstream of the inlet valve 62, such as in the inlet manifold 42. The pressure sensor 66 can be configured to sense the pressure of the diluent 60 on an inlet manifold side of the inlet valve 62 and provide a signal 67 indicative of the sensed pressure to the controller 12. The pressure sensor 66 can dynamically sense changes in the pressure of the diluent 60 during a dispensing operation that includes one or more dispense and/or flush stages. Monitoring the pressure of the diluent 60 during a dispensing operation can enable the controller 12 to sense a drop of inlet manifold pressure (e.g., due to a drop in the pressure provided by the source of diluent 60) during the dispensing operation, which can cause a corresponding drop in a flow rate of the diluent 60 through the active eductor 48.

The pressure sensor 66 can be located proximate to a flush valve 70 and/or the selector valve 46 that is used to perform flush stages. The pressure sensor 66 can be operated by an excitation voltage (e.g., a 10 V DC voltage), and can output the signal 67 (e.g., millivolt range voltage) indicative of the pressure sensed by the pressure sensor 66, e.g., a voltage that is proportional to the incoming diluent pressure. The signal 67 can be coupled to the processor 28 via the I/O interface 30 to provide the processor 28 with information on pressure with respect to time during operation of the dispensing system 10. The output signal can be routed to the processor 28 on a local printed circuit board or to a remotely operated controller 12.

The dispenser 14 can further include a concentration sensor 68 configured to detect the concentration of one or more substances (e.g., chemical product, mineral salt, and/or other substance) in the diluent 60 and/or dispensed solutions and provide a signal 71 indicative of the concentration to the controller 12. The concentration sensor 68 can include an optical probe and/or a conductive probe and can be located in the flush manifold 44 (depicted) or another point downstream of the eductors 48. For example, the concentration sensor 68 can be built into an output port 72 of flush manifold 44. In some implementations, the concentration sensor 68 and/or an additional concentration sensor (not shown) can be located in the inlet manifold 42 and used to determine concentrations of substances in the diluent 60 prior to mixing with the chemical products 18, 20. Advantageously, locating the concentration sensor 68 in the flush manifold 44 can allow the dispensing system 10 to monitor multiple dispense channels and provide solutions to multiple points of use using a single concentration sensor 68 rather than separate sensors that detect the concentration of the chemical product for each individual chemical and/or point of use.

The signal 71 provided to the controller 12 by concentration sensor 68 can be used to determine a characteristic of the solution in the flush manifold 44, such as the concentration of one or more substances (e.g., calcium carbonate and/or magnesium) that contribute to the hardness in the diluent 60 and/or the concentration of one or more of the chemical products 18, 20. The signal 71 can be an analog signal (e.g., voltage or current) and/or a digital signal. For implementations in which the signal is a digital signal, the concentration sensor 68 can include electronic circuitry that quantifies the characteristic, e.g., as a concentration level in parts-per-million. The controller 12 can be configured to sample the signal 71 and store these samples and/or the concentrations determined therefrom in memory 32 as a sequence of readings indicative of the characteristic. The concentration sensor 68 can allow the controller 12 to adjust the amount of chemical product dispensed to the point of use during the dispensing operation to account for water hardness and/or variations in chemical product flow rates through the eductors 48. The dispensing system 10 can thereby provide more effective solutions as compared to dispensing systems lacking the concentration sensor feature.

The flush valve 70 can selectively fluidically couple the inlet manifold 42 to the flush manifold 44 in response to signals from the controller 12. This can allow the controller 12 to execute flush stages before and/or after activating the selector valves 46 to dispense chemical solutions. These flush stages can be used to clear the flush manifold 44 of chemical solutions between dispense stages, transport previously dispensed chemical solutions to the point of use, and/or provide a desired amount of diluent 60 to the point of use. In some implementations, this flushing feature can be enabled by capping the pickup port 54 of one of the eductors 48, e.g., the eductor 48 furthest from the output port 72 of flush manifold 44) and activating the respective selector valve 46 to flush the flush manifold 44. In this case, the flush valve 70 can be omitted.

The controller 12 can respond to a sensed drop in the pressure of the diluent 60, for example, by increasing an amount of time the respective selector valve 46 is kept open. This change in the duration of the dispense stage can compensate for a leaning out of the chemical solution by increasing the volume of the chemical solution provided to the point of use. The leaning out can be due to a reduction in the rate the chemical product 18, 20 is drawn into pickup port 54 caused by a lower flow rate of diluent 60 through the eductor 48 than would have occurred if the pressure of the diluent 60 had not dropped.

By way of example, the pressure regulator 64 can be configured so that the pressure at the pressure sensor 66 is normally at a level (e.g., 30 PSI) that allows the eductors 48 to generate their rated suction when the selector valve 46 is open. When an event occurs that drops the pressure of the diluent 60, such as another draw on the source of diluent 60, the controller 12 can detect the pressure drop based on a change in the signal generated by the pressure sensor 66. In response to determining that the inlet manifold pressure has dropped below the minimum pressure at which the eductors 48 generate their rated suction, the controller 12 can generate an alarm using the HMI 26 or some other indicator, e.g., a buzzer or light. The controller 12 can also compensate for the reduced suction at the pickup port 54 of the active eductor 48 by keeping the selector valve 46 open for a longer period of time as described above. For dispensing systems using a common diluent inlet line, a single pressure sensor 66 can be used for all dispensing operations. The controller 12 can also be configured to verify the dispensing system 10 is operating properly based at least in part on the output of the concentration sensor 68.

Dispensing events, such as changes in the pressure of the diluent 60, concentration levels of substances in the diluent 60 and/or dispensed solution, and/or low chemical product conditions, can be logged in memory 32 for later analysis, and can also trigger visual and/or audible alarms to notify the user of the event.

Figure 2:
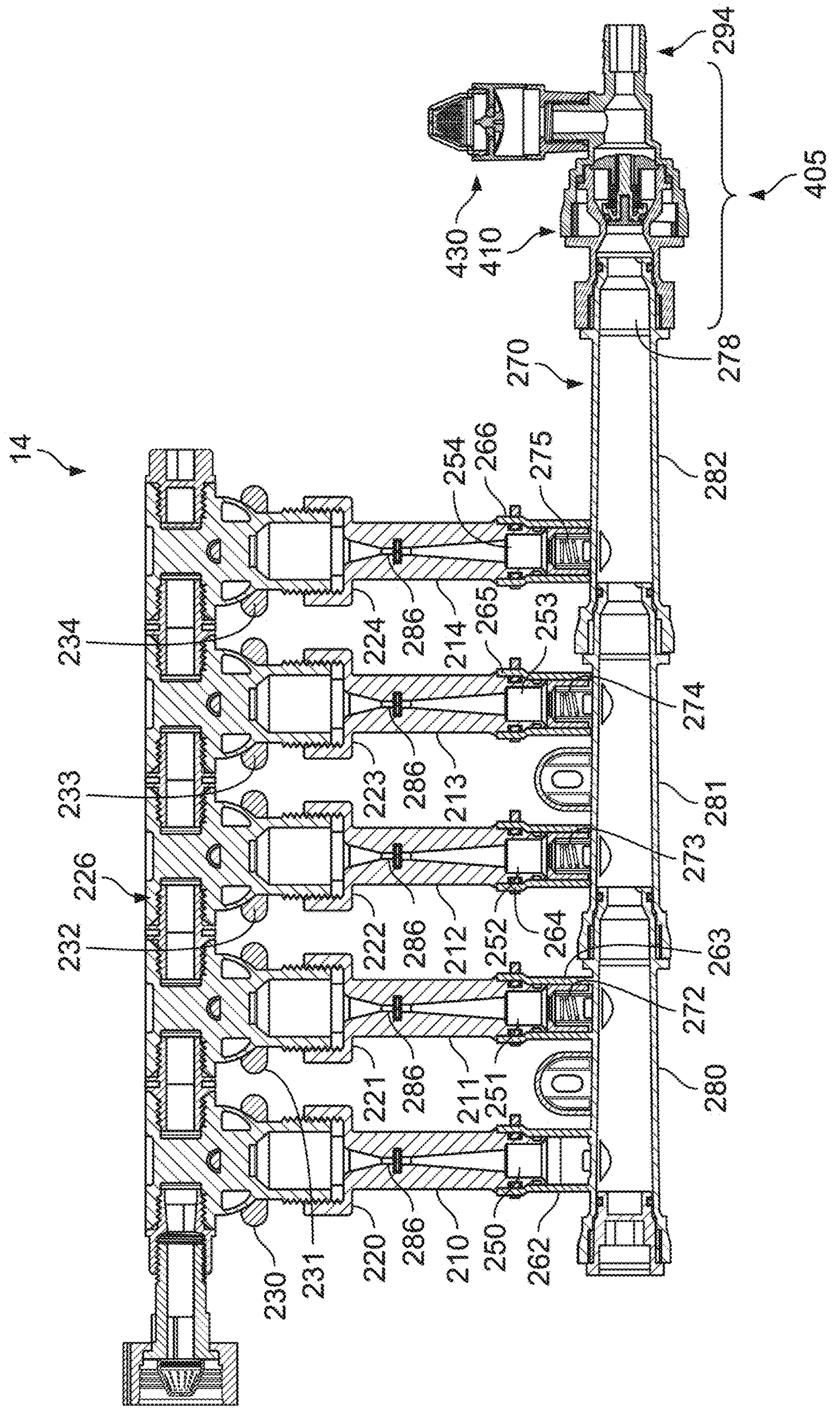
FIG. 2 depicts a cross-sectional view of an exemplary dispenser of a dispensing system.

FIG. 2 depicts an exemplary dispenser 14 of a dispensing system. The dispenser 14 includes a plurality of eductors 210-214 each having an inlet port 220-224 coupled to an inlet manifold 226 by a respective selector valve 230-234, a pickup port 286, and a discharge port 250-254. Each of the selector valves 230-234 can include a solenoid configured to open or close the selector valve 230-234 in response to signals from the controller. In the exemplary implementation depicted, the discharge port 250 of eductor 210 is coupled directly to an intake port 262 of a flush manifold 270, and the discharge ports 251-254 of the remaining eductors 211-214 are coupled to the intake ports 263-266 of flush manifold 270 by check valves 272-275. The flush manifold 270 can include one or more modules 280-282 that are configured to be fluidically coupled to each other to form a flush manifold having a desired number of intake ports.

The leftmost or "upstream" eductor 210 can be configured as a flush eductor that is used to provide diluent from the inlet manifold 226 to the flush manifold 270 without injecting any chemical products. The controller can activate the selector valve 230 coupling the flush eductor 210 to the inlet manifold 226 to flush chemical solutions from the flush manifold 270. The flush eductor 210 can be a "high flow" eductor as compared to the other eductors 211-214 to shorten flush times. Alternatively, the flush eductor 210 can include a suitably sized conduit that lacks a venturi.

In operation, the controller can sequentially activate one or more of the selector valves 231-234 for various periods of time to inject a desired amount of one or more chemical products into the flush manifold 270. Once the mixture of chemicals defined by the dispensing application has been dispensed, the controller can open the selector valve 230 of flush eductor 210 to flush the flush manifold 270 with diluent for a period of time sufficient to flush each dispensed solution to the point of use.

The check valves 272-275 can be configured to prevent solutions being dispensed by one or more of eductors 210-214 from back-flowing into the remaining inactive eductors as described above. This can prevent any of the chemicals dispensed by one eductor from entering one or more of the other eductors from the flush manifold 270. Advantageously, the check valves 272-275 can prevent different chemicals from coming into contact within the eductors 211-214 and plugging the venturi orifices thereof.

The check valves 272-275 can also provide a dynamic flood ring that keeps their respective eductor 211-214 in a constantly primed or "flooded" state by preventing solution from draining out of the eductor between activations. In addition, the check valves 272-275 can prevent air from entering the eductor and drying out any remaining chemical solutions, which could create residue inside the eductors 211-214. By independently varying the resistance provided to the flow of fluids through the eductor, the check valves 272-275 can provide more efficient operation than would be provided by fixed flood rings.

Still further, the check valves 272-275 can provide an additional benefit of creating a dynamic barrier that opens when the eductor 211-214 is activated and closes when the eductor 211-214 is idle to prevent contamination. Check valves 272-275 can be implemented as cartridges that can be added to existing systems as a separate part, or the check valves 272-275 can be integrated into the eductors 211-214 and/or the flush manifold 270. In some implementations, the check valves 272-275 are umbrella valves.

As shown, the dispenser 14 includes a manifold flood valve assembly (MFVA) 405 coupled to the outlet 278 of the flush manifold 270. The MFVA 405 reduces the amount of air within the flush manifold 270 following chemical dispensing operations. The MFVA 405 operates to maintain the flush manifold 270 in a flooded state to prevent/minimize the incursion of air (and consequently oxygen) in the flush manifold 270 between dispense operations. The MFVA 405 includes a one-way valve (such as a check valve) 410 and a vent 430 downstream of the check valve 410.

Figure 3:
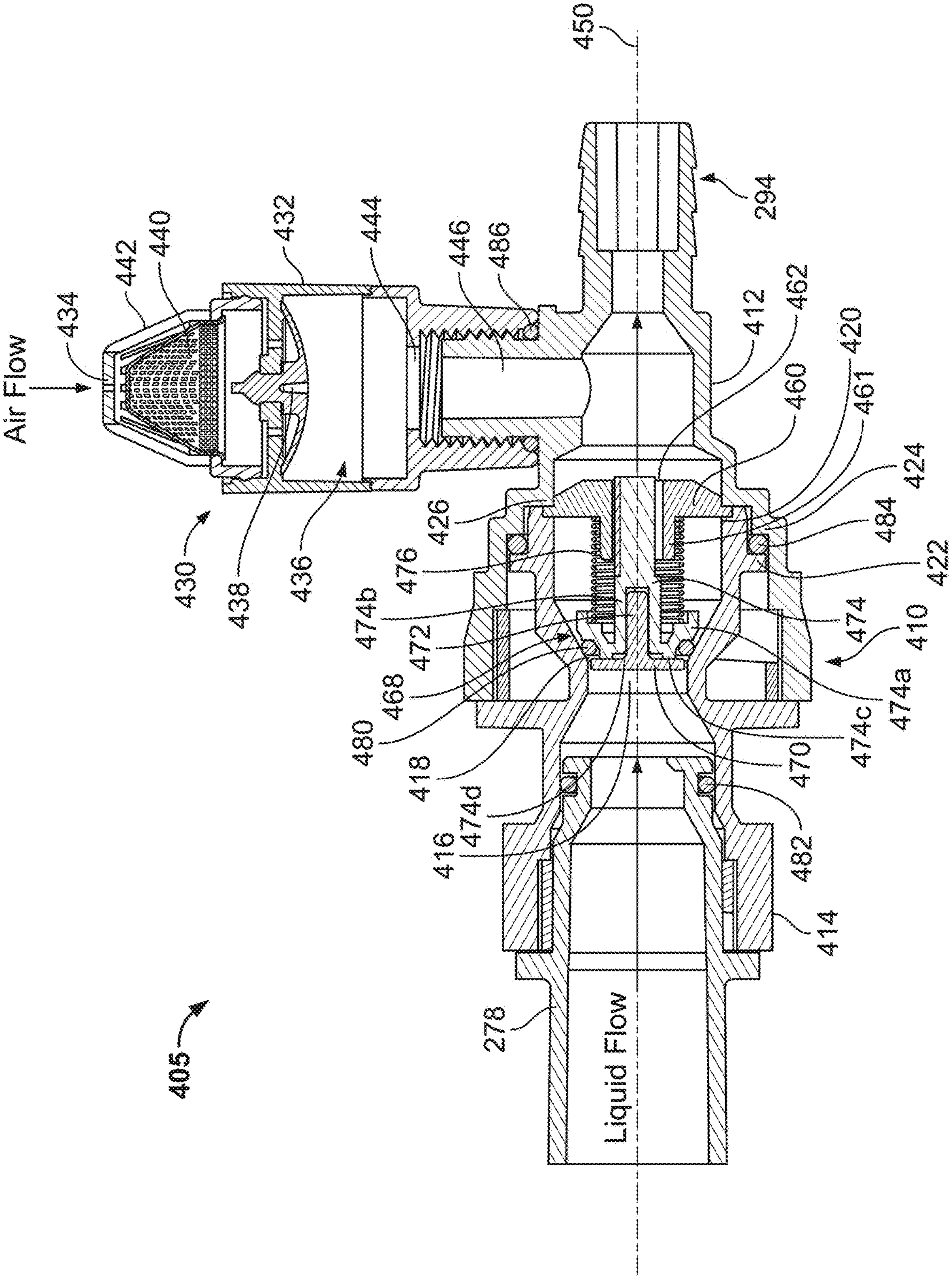
FIG. 3 depicts a cross-sectional view of a first exemplary implementation of a manifold flood valve assembly.
Figure 4:
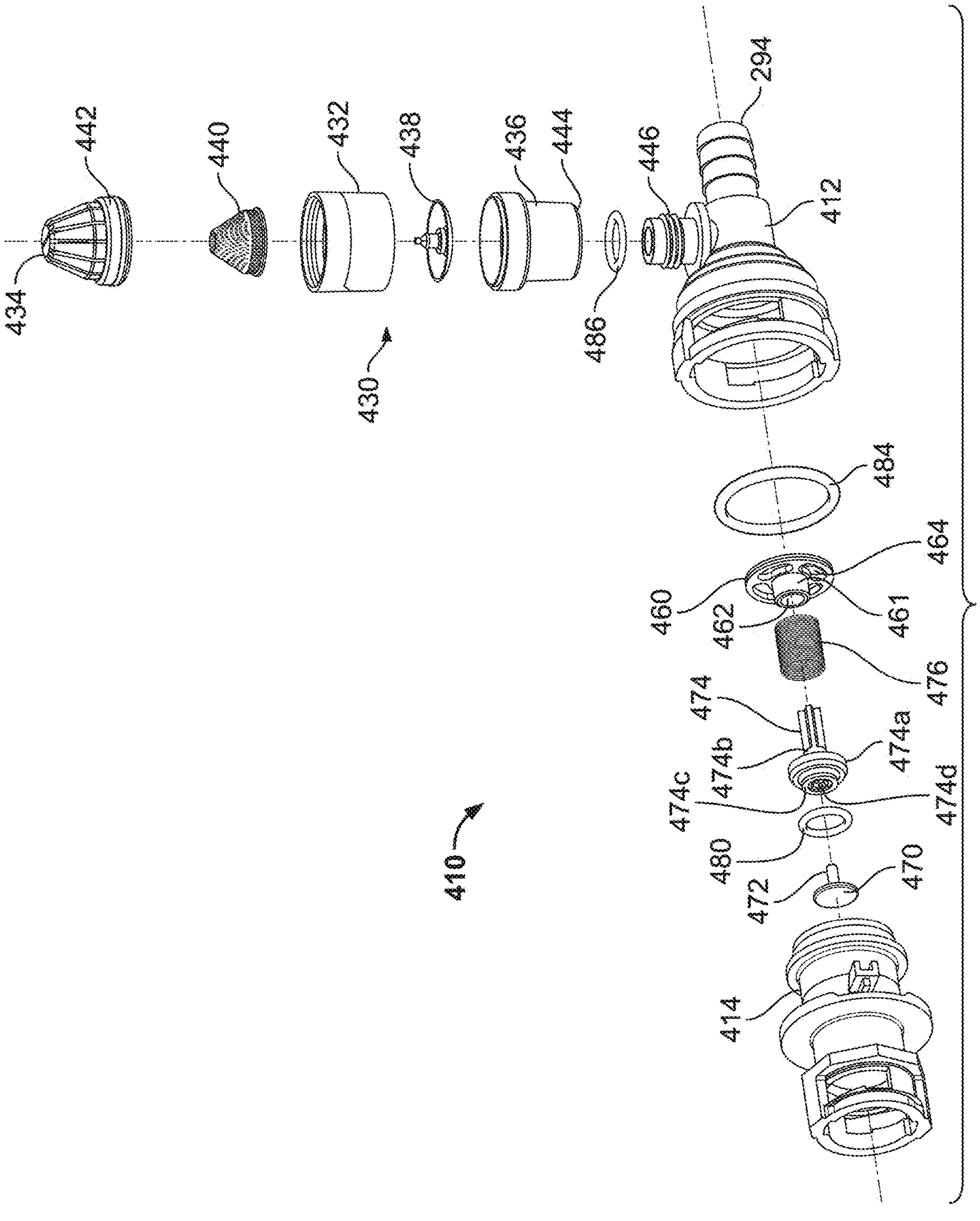
FIG. 4 depicts an exploded view of the manifold flood valve assembly of FIG. 3.

FIGS. 3-4 depict a first exemplary implementation of an MFVA 405. FIG. 3 is a cross-sectional view, and FIG. 4 is an exploded view. The MFVA 405 includes a check valve 410 and a vent 430. The check valve 410 is operable to allow fluid to flow through the check valve 410 in the liquid flow direction and block fluid from flowing through the check valve 410 in the opposite direction. The check valve 410 can maintain a flush manifold upstream of the check valve 410 in a flooded condition. The vent 430 allows air to flow into the MFVA 405 through the vent 430 to vent the tubing downstream of the check valve 410.

The check valve 410 includes a first body portion 414 that forms an inlet 416 to the check valve 410, and a second body portion 412 that forms a check valve outlet 294. The first body portion 414 is coupled to the second body portion 412. An alignment plate 460 (e.g., a valve plate) is positioned between a plate seat 420 in the first body portion 414 and a shoulder 426 of the second body portion 412. An O-ring 484 is positioned between the flange seat 422 of the first body portion 414 and a shoulder 424 of the second body portion. The O-ring 484 forms a seal to inhibit leaking from the connection of the first body portion 414 and the second body portion 412.

The first body portion 414 is fluidically coupled to the outlet 278 of the flush manifold 270. An O-ring 482 is disposed around the outlet 278 to form a seal between the outlet 278 and the first body portion 414. Liquid (e.g., diluent, chemical solution) flows out of the outlet 278 into the inlet 416 of the check valve 410.

A plug assembly 468 is positioned in the interior of the check valve 410 within the first body portion 414. A valve spring 476 is positioned between the valve plate 460 and the plug assembly 468. The valve spring 476 biases the plug assembly 468 toward the inlet 416 of the check valve. The plug assembly 468 is free to move linearly along a central axis 450 of the check valve 410 against the force of the valve spring 476. In some implementations, the plug assembly 468 is positioned within the interior of the second body portion 412.

The plug assembly 468 includes a plug 470 and a plug body 474. The plug body 474 includes an annular rim 474*a* connected to a stem 474*b* by a front face 474*c*. The valve spring 476 is positioned between the stem 474*b* and the annular rim 474*a*. The annular rim 474*a* at least partially surrounds the valve spring 476, and the valve spring 476 at least partially surrounds the stem 474*b*.

The plug 470 is configured to block the inlet 416 when the check valve 410 is in a closed position. For example, the plug 470 blocks fluid flow in a direction opposite the liquid flow from the flush manifold 270. The plug 470 has a downstream plug stem 472 extending from a rear surface of the plug 470. The downstream plug stem 472 extends through a central aperture 474*d* in the front face 474*c* and into the stem 474*b* of the plug body 474. The downstream plug stem 472 maintains alignment of the plug 470 with the stem 474*b*.

An O-ring 480 is disposed around the plug body 474 near the plug 470. When the plug assembly 468 is in a closed position (e.g., blocking the inlet), the O-ring 480 is in contact with the valve seat 418 on the first body portion 414. The O-ring 480 forms a seal between the plug assembly 468 and the first body portion 414 when the plug assembly 468 is in the closed position.

In some implementations, the plug body 474 and the plug 470 can be a single unitary piece. The plug 470 can form a first planar surface of the plug assembly 468 and the plug body 474 can form a second planar surface opposite the first planar surface. The stem 474*b* extends from the second planar surface. A groove can be formed between the two planar surfaces to retain the O-ring 480 to form the seal with the valve seat 418.

The alignment plate 460 has a central opening 462 surrounded by an annular wall 461. The annular wall 461 extends outward from the alignment plate 460. The valve spring 476 is positioned around the annular wall 461, and the annular wall 461 retains the valve spring 476 in a position along the central axis 450. The alignment plate 460 includes a plurality of apertures 464 arranged circumferentially around the alignment plate 460 and radially outward of the annular wall 461. The plurality of apertures 464 enable fluid flow through the alignment plate 460.

When fluid (e.g., diluent, chemical solution) flows from the flush manifold 270 through the outlet 278, the fluid exerts a force on the plug 470. When the force exerted by the fluid on the plug 470 exceeds the force exerted by the valve spring 476, the plug assembly moves linearly downstream along the central axis 450 compressing the valve spring 476 and moving the plug assembly 468 to an open position. In the open position, the stem 474*b* of the plug body 474 extends into the central opening 462 of the alignment plate 460. The fluid flows around the plug 470 and through the apertures 464 to the outlet 294.

When the fluid flow from the flush manifold 270 stops, the force exerted on the plug assembly 468 by the fluid decreases below the force exerted by the valve spring 476 on the plug assembly 468. The plug assembly 468 moves linearly upstream along the central axis to a closed position as the valve spring 476 decompresses. In the closed position, the O-ring 480 forms a seal between the plug assembly 468 and the valve seat 418 blocking fluid flow in a reverse direction (e.g., from the outlet 294, through the alignment plate 460 to the inlet 416).

The second body portion 412 of the check valve 410 includes a vent connector 446 (e.g., a vent connection port) to couple the vent 430 to the check valve 410. An O-ring 486 is disposed around the vent connector 446 to form a seal between the vent 430 and the second body portion 412.

The vent 430 includes a vent body 432 with a vent inlet 434 and a vent outlet 444. The vent 430 includes a vent check valve 436 within the vent body 432. In a closed position, the vent check valve 436 blocks fluid flow from the second body portion 412 through the vent outlet 444 to the vent inlet 434. In an open position, the vent check valve 436 allows air flow from the vent inlet 434 through the vent outlet 444 to the second body portion 412 to vent tubing downstream of the check valve 410. The vent inlet 434 can include a screen 440 protected by a housing 442 to prevent debris from entering the vent 430. The vent 430 vents the vacuum pressure generated by the flow of liquid thereby enabling the liquid to flow from the chemical dispenser 14 to the point of delivery when the check valve 410 is in the closed position.

The vent check valve 436 includes an umbrella valve 438. In a closed position, the umbrella valve 438 seals the vent outlet 444 to block water from flowing through the vent outlet 444 to the vent inlet 434. In an open position, the umbrella valve 438 is not in contact with the valve outlet and air is allowed to flow through the vent 430 to the outlet 294. The umbrella valve 438 can be actuated from the closed position to the open position by a decrease in pressure at the valve outlet created when liquid flow through check valve 410 stops (e.g., when a selector valve 230-234 is closed). When the check valve 410 closes, the velocity of the liquid continues to move the liquid downstream through the outlet 294 creating a vacuum effect that opens the check valve 436.

Figure 5:
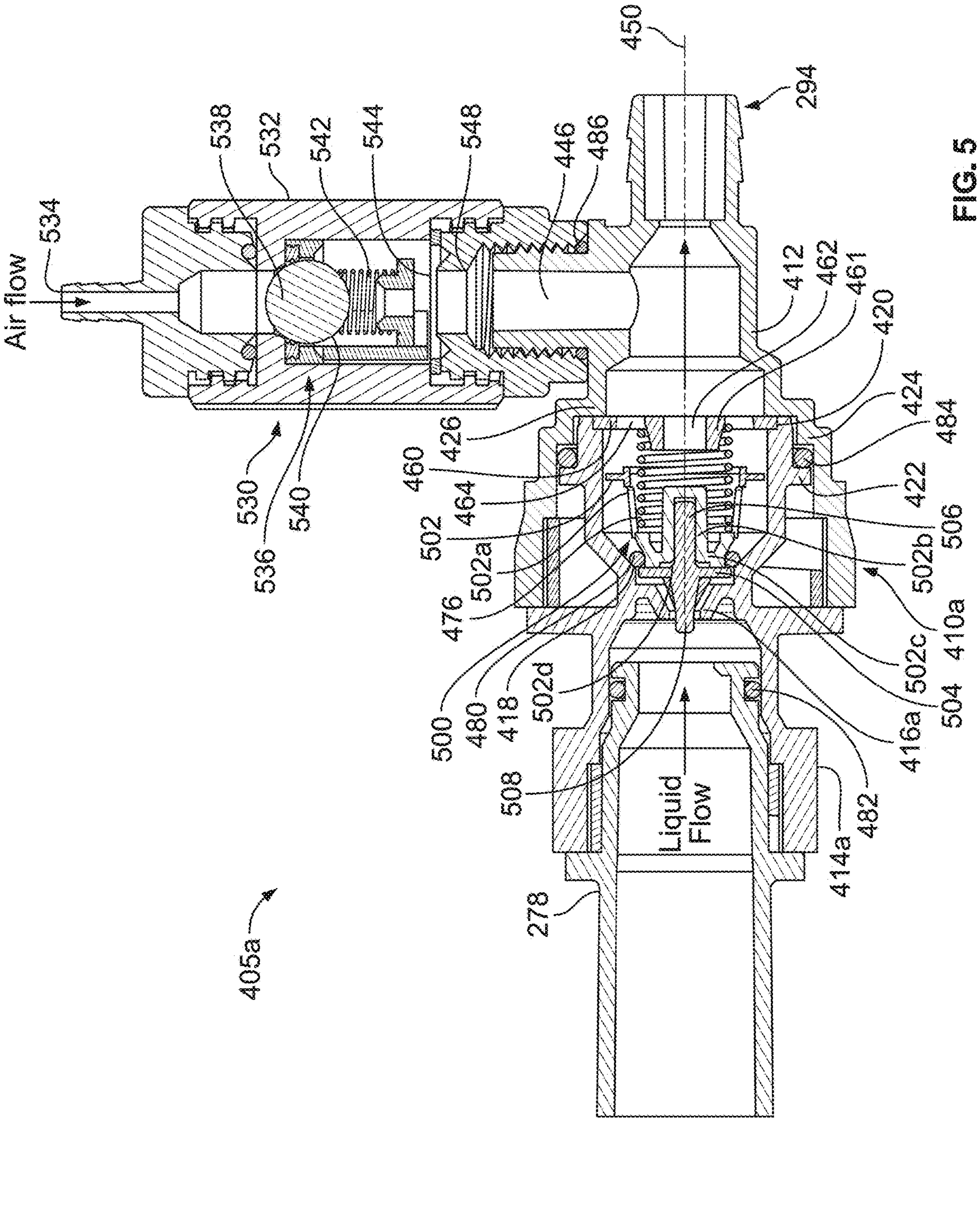
FIG. 5 depicts a cross-sectional view of a second exemplary implementation of a manifold flood valve assembly.
Figure 6:
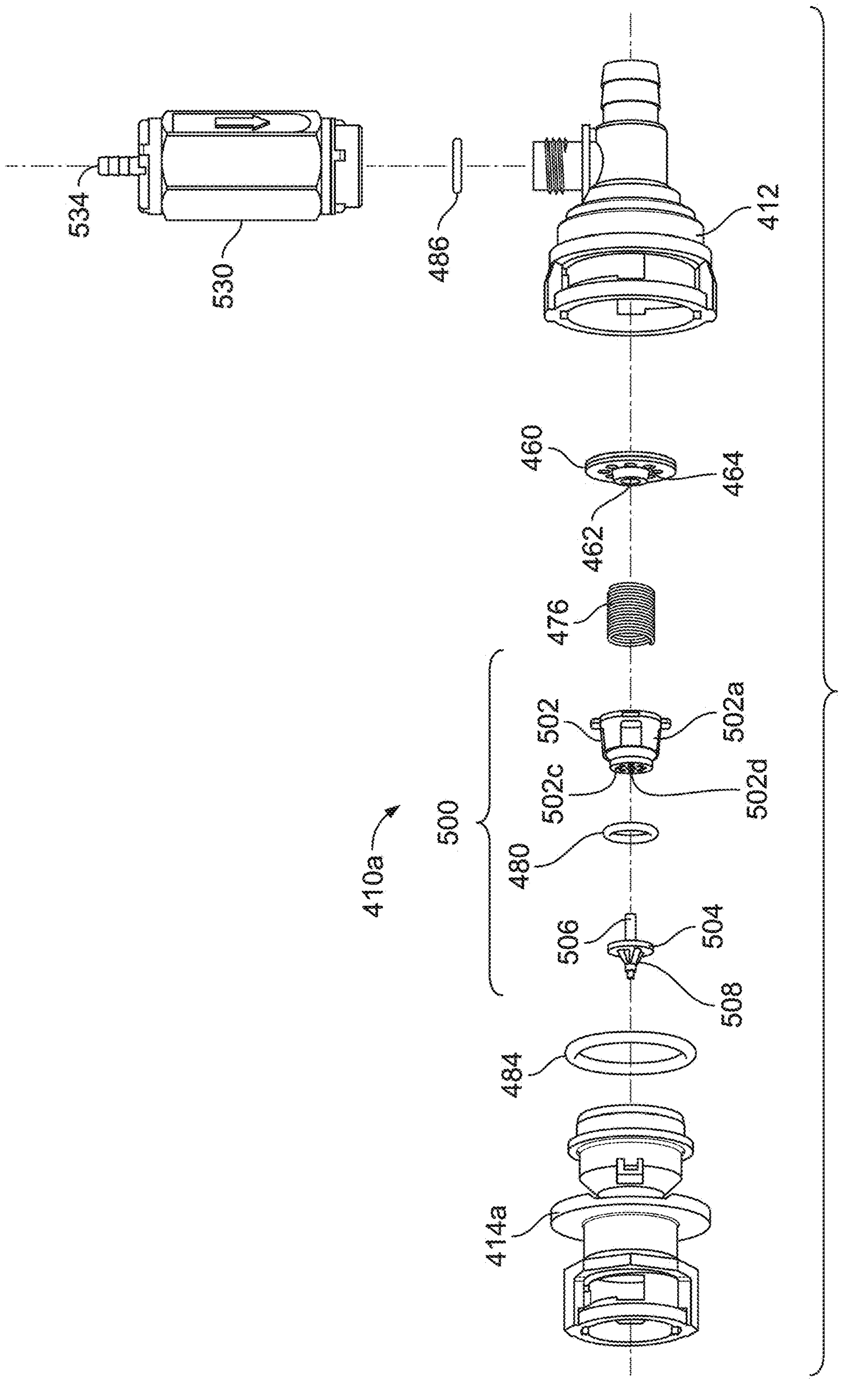
FIG. 6 depicts an exploded view of the manifold flood valve assembly of FIG. 5.

FIGS. 5 and 6 depict a second exemplary implementation of a manifold flood valve assembly 405*a*. FIG. 5 is a cross-sectional view, and FIG. 6 is an exploded view. The MFVA 405*a* is substantially the same as MFVA 405 with the exception of the shape of the inlet 416*a* in the first body portion 414*a*, the plug assembly 500 in check valve 410*a*, and the vent 530. The plug assembly 500 can move linearly along a central axis between an open position allowing fluid flow through the check valve 410*a* from the inlet 416*a* to the outlet 294 and a closed position blocking fluid flow in the reverse direction (e.g., from the outlet 294 to the inlet 416). The inlet 416*a* is narrower than the inlet 416 of MFVA 405.

The plug assembly 500 includes a cage 502 and a plug 504. The cage 502 includes an outer cylinder 502*a* and an inner cylinder 502*b* connected by a front face 502*c*. The outer cylinder 502*a* can have a frustoconical shape. The inner cylinder 502*b* is shorter than stem 474*b* of plug body 474 such that in the closed position the inner cylinder 502*b* does not extend through the central aperture 462 of the valve plate 460. The valve spring 476 is positioned between the inner cylinder 502*b* and the outer cylinder 502*a*.

The plug 504 includes a downstream plug stem 506 extending from the rear face of the plug 504. The downstream plug stem 506 extends through a central aperture 502*d* of the front face 502*c* into the interior of the inner cylinder 502*b*. The downstream plug stem 506 maintains the alignment of the plug 504 with the central axis 450 when the check valve 410*a* is in the open position. In the closed position, the plug 504 blocks the inlet 416*a* thereby blocking fluid flow in the reverse direction. The plug 504 includes an upstream plug stem 508 extending from the front face of the plug 504. The upstream plug stem 508 extends through the inlet 416*a* when the check valve 410*a* is in the closed position. The upstream plug stem 508 maintains alignment of the plug assembly 500 with the central axis 450 when the check valve 410*a* is in the closed position.

The vent connector 446 in the second body portion 412 of the check valve 410*a* enables the vent 530 to couple to the check valve 410*a*. The O-ring 486 is disposed around the vent connector 446 to form a seal between the vent 530 and the second body portion 412.

The vent 530 includes a vent body 532 with a vent inlet 534 and a vent outlet 544. The vent 530 includes a vent check valve 536 within the vent body 532. In a closed position, the vent check valve 536 blocks fluid flow from the second body portion 412 through the vent outlet 544 to the vent inlet 534. In an open position, the vent check valve 536 allows air flow from the vent inlet 534 through the vent outlet 544 to the second body portion 412 to vent tubing downstream of the check valve 410*a*.

The vent check valve 536 includes a ball 538 and a vent valve spring 542. The vent valve spring 542 biases the ball 538 against the vent check valve seat 540 when the vent check valve 536 is in a closed position. In an open position, the vent valve spring 542 is compressed and the ball 538 is not in contact with the check valve seat 540 allowing air flow through the vent 530.

Figure 7:
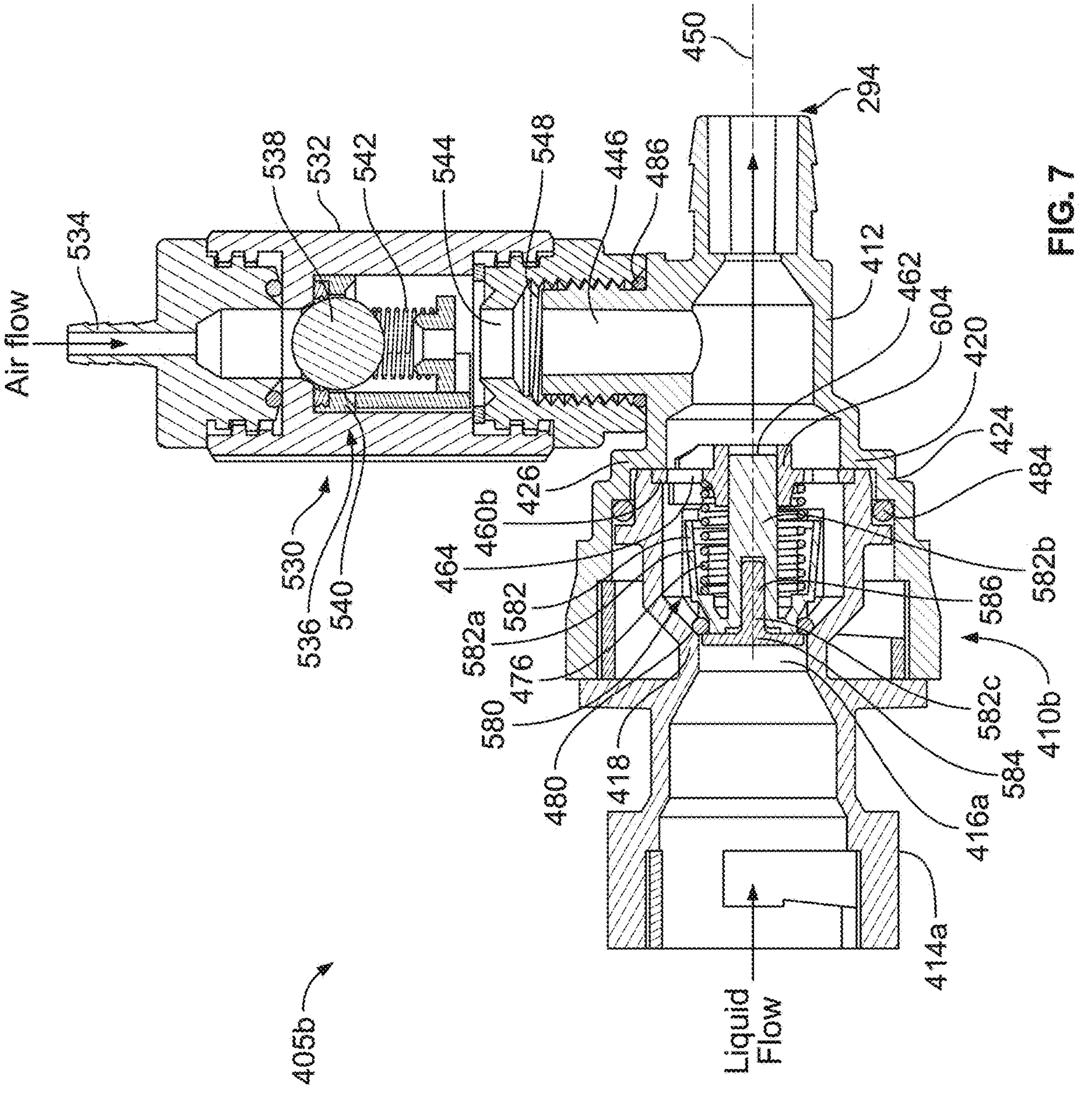
FIG. 7 depicts a cross-sectional view of a third exemplary implementation of a manifold flood valve assembly.
Figure 8:
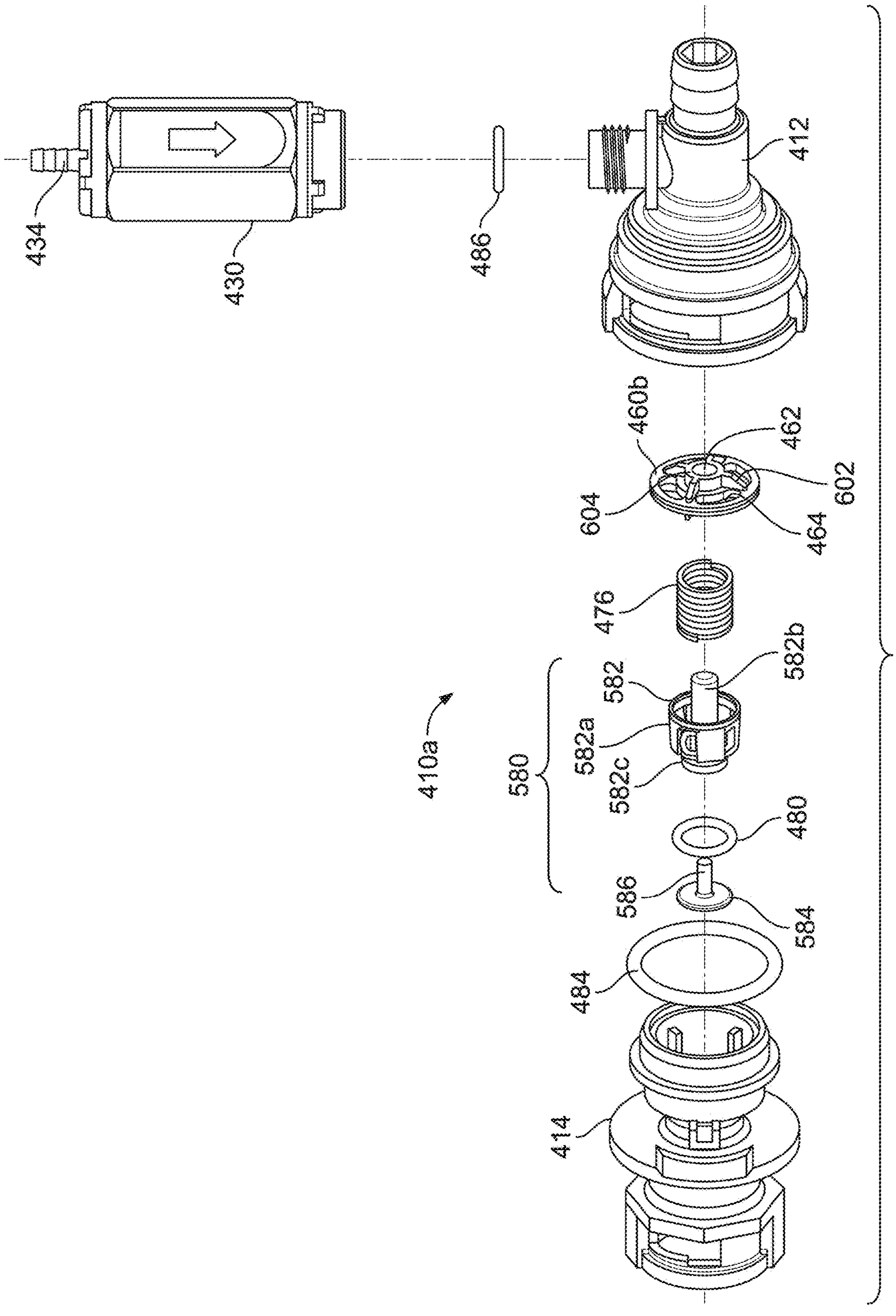
FIG. 8 depicts an exploded view of the manifold flood valve assembly of FIG. 7.

FIGS. 7 and 8 depict a third exemplary implementation of a manifold flood valve assembly 405*b*. FIG. 7 is a cross-sectional view, and FIG. 8 is an exploded view. The MFVA 405*b* is substantially the same as MFVA 405*a* with the exception of the inlet 416 in the first body portion 414, the plug assembly 580, and the alignment plate 460*b*.

The plug assembly 580 includes a cage 582 and a plug 584. The cage 582 includes an outer cylinder 582*a* and an inner cylinder 582*b* connected by a front face 582*c*. The inner cylinder 582*b* is longer than the inner cylinder 502*b* of cage 502. The valve spring 476 is positioned between the inner cylinder 582*b* and the outer cylinder 582*a*. The inner cylinder 582*b* extends through the central opening 462 of the alignment plate 460 when the plug assembly 580 is in both the open position and the closed position. The inner cylinder 582*b* maintains the alignment of the plug assembly 580 along the central axis 450.

The plug 584 has a flat front face (or substantially flat front face) without an upstream plug stem extending from the front face. The plug 584 includes a downstream plug stem 586 extending from the rear face of the plug 584. The downstream plug stem 586 extends through a central aperture of the front face 582*c* into the interior of the inner cylinder 582*b*. The downstream plug stem 586 maintains the alignment of the plug 584 with the central axis 450. In the closed position, the plug 584 blocks the inlet 416 blocking fluid flow in the reverse direction.

The opening of the inlet 416 in the first body portion 414 has the same diameter as the internal diameter of the first body portion 414 at the inlet 416. The inlet 416 has a greater flow area through the check valve 410*b* than the inlet 416*a* of check valve 410*a*. The flat face of plug 584 completely blocks the inlet 416 with the O-ring 480 forming a seal with the valve seat 418 when the plug assembly 580 is in a closed position. The larger inlet size of inlet 416 is enabled by having the inner cylinder 582*b* of the cage 582 protrude through the alignment plate 460*b* in both the open and closed positions to maintain alignment of the plug assembly 580 along the central axis 450. In contrast, inlet 416*a* in the first body portion 414*a* has a smaller diameter than the internal diameter of the first body portion 414*a* resulting in a reduced flow area through the inlet 416*a*. The upstream plug stem 508 protrudes through the inlet 416*a* in check valve 410*a* to maintain the alignment of the plug assembly 500 along the central axis 450 when the plug assembly 500 is in the closed position.

The alignment plate 460*b* includes multiple ribs 602 that extend radially from the annular wall 604 toward the outer edge of the alignment plate 460*b*. The ribs 602 provide additional rigidity to the alignment plate 460*b* and function to direct flow through the apertures 464. The apertures 464 have an elongated shape and are interspersed between the ribs 602. As shown, the alignment plate 460*b* includes four ribs 602 with an elongated aperture 464 extending between adjacent ribs 602 for a total of four apertures.

The alignment plate **460*b* has an annular wall 604 that extends from both the front and rear faces of the alignment plate 460*b* surrounding the central aperture 462. The annular wall 604 provides more contact surface area with the inner cylinder 582*b* to maintain alignment of the plug assembly 580 in both the open and closed positions as compared with annular wall 461 of alignment plate 460, which protrudes from only the front face of the alignment plate 460**.

Figure 9:
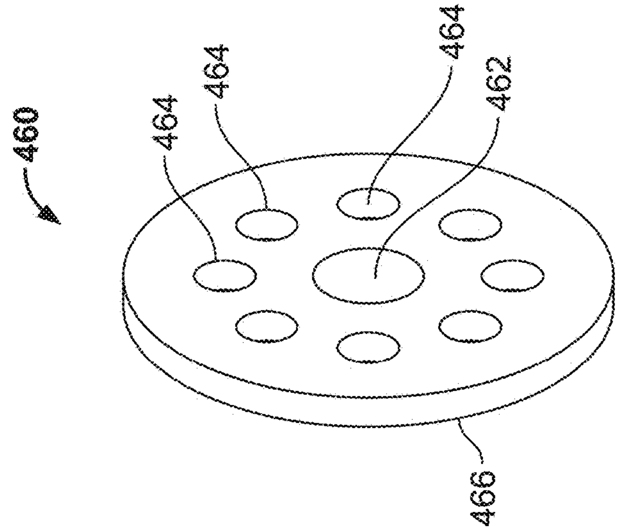
FIG. 9 depicts a perspective view of an exemplary check valve alignment plate.

FIG. 9 depicts a perspective view of exemplary check valve alignment plate 460. FIG. 9 shows the rear (e.g., downstream) face of the alignment plate 460. The alignment plate includes a central opening 462. Multiple apertures 464 are arranged circumferentially around the central opening 462. The apertures 464 are positioned radially between the central opening 462 and the outer edge 466 of the alignment plate 460. The apertures 464 enable fluid flow through the alignment plate 460.

Figure 10A:
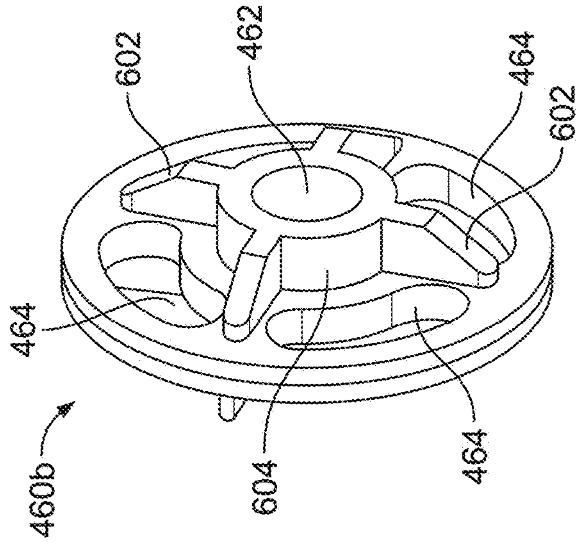
FIGS. 10A and 10B depict front and back perspective views of another exemplary check valve alignment plate.
Figure 10B:
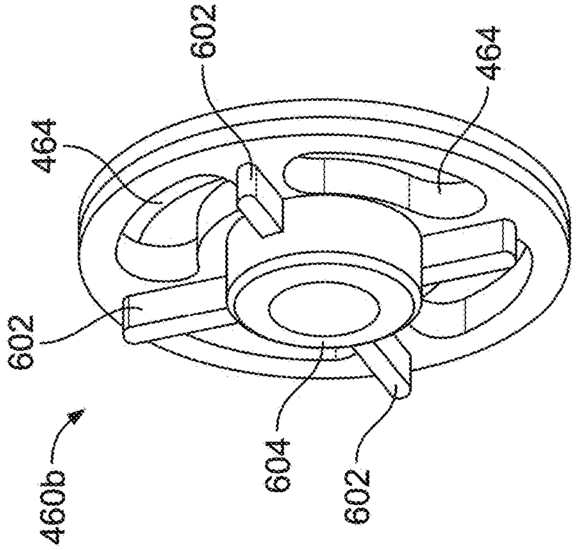

FIGS. 10A and 10B depict front and back perspective views, respectively, of exemplary check valve alignment plate **460*b*. The alignment plate 460*b* includes a central opening 462 surrounded by annular wall 604. Multiple ribs 602 extend radially from the annular wall 604 toward the outer edge 466. Between the ribs 602, the alignment plate 460*b* has elongated aperture 464. The apertures 464 are bounded by the annular wall 604, the ribs 602, and the outer edge 466. The front and back of the alignment plate 460*b* are substantially the same enabling the alignment plate to be installed in a check valve irrespective of the orientation of the front or back faces whereas the alignment plate 460** has a specific installation orientation for the front and back faces.

Figure 11:
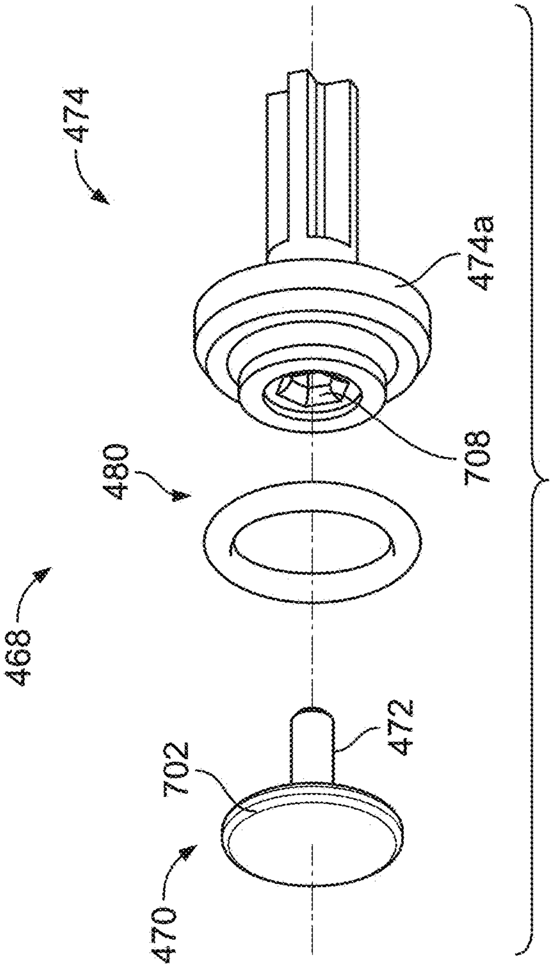
FIG. 11 depicts a detailed exploded view of an exemplary check valve plug assembly.

FIG. 11 depicts a detailed exploded view of exemplary check valve plug assembly 468. The plug assembly 468 includes the plug 470, the O-ring 480, and the plug body 474. The plug 470 includes the downstream plug stem 472, and disk 702. The plug body 474 includes a cavity 708 in which the downstream plug stem 472 is inserted. The downstream plug stem 472 can be inserted into the cavity 708 with, for example, a press fit or an interference fit to couple the plug 470 to the plug body 474. The O-ring 480 is retained in place between the plug 470 and the plug body 474. When installed in a check valve, the disk 702 blocks the inlet, and the O-ring 480 forms a seal to inhibit reverse flow through the check valve when the plug assembly 468 is in a closed position. The annular rim **474*a* of the plug body functions to retain the spring 476 in position around the plug stem 472 in a similar manner as the cages 502 and 582**.

Figure 12:
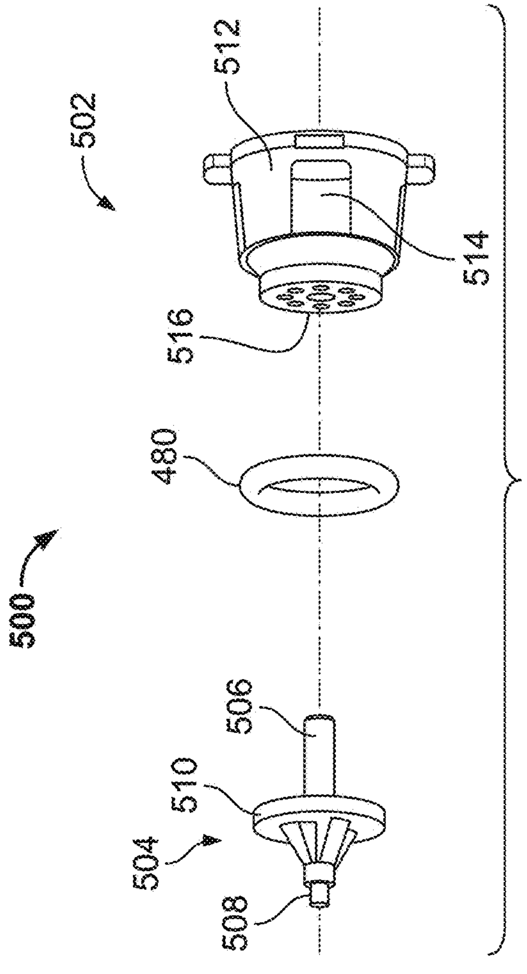
FIG. 12 depicts a detailed exploded view of another exemplary check valve plug assembly.

FIG. 12 depicts a detailed exploded view of exemplary check valve plug assembly 500. The plug assembly 500 includes the plug 504, the O-ring 480, and the cage 502. The plug 504 includes the upstream plug stem 508, downstream plug stem 506, and disk 510. The cage 502 includes cage body 512. The cage body 512 includes openings 514 to allow flow through the cage body 512. The cage body 512 includes a cavity 516 in which the downstream plug stem 506 is inserted. The O-ring 480 is retained in place between the plug 504 and the cage 502. When installed in a check valve, the disk 510 blocks the inlet, and the O-ring 480 forms a seal to inhibit reverse flow through the check valve when the plug assembly 500 is in a closed position.

FIG. 16A-16D depict a fourth exemplary implementation of a MFVA 405. The depicted implementation is generally similar to those previously discussed, with a different plug assembly 1600 configuration that does not have a cage. In some examples, plug assembly 1600 is generally similar to the plug assembly 500 depicted in FIGS. 7, 8, and 12 with the cage removed. The plug assembly 1600 includes a plug body 1602 with a plug stem 1604 extending from the plug body 1602. When assembled, the plug stem 1604 extends through the spring 476 and the central opening 462 of the alignment plate **460*b*. The plug stem 1604 cooperates with the alignment plate 460*b* to maintain the plug assembly aligned within the first body portion 414 of the MFVA 405** during operation.

The plug assembly 1600 has a groove formed in the body 1602 between two planar surfaces 1608 and 1610. The O-ring 480 is captured between the planar surfaces 1608 and 1610. In some implementations, the groove can be formed within a solid plug body 1602. In some implementations, the plug assembly 1600 is formed from two separate parts. For example, the plug assembly 1600 includes a disk 1612 with a stem 1614 extending from one surface of the disk (e.g., planar surface 1610). The stem 1614 is configured to fit within an aperture (not shown) within an upstream end 1618 of the plug body 1602. This construction is similar to that of the plug assembly 500 implementation depicted in FIGS. 7, 8, and 12 but with the cage removed.

In some implementations, the plug body 1602 includes an angled or chamfered surface 1616 between the two planar surfaces 1608 and 1610. This chamfered surface 1616 can be tapered to correspond with the interior surface of the first body portion 414 of the MFVA 405.

In some implementations, the stem 1604 includes one or more grooves 1606. The grooves 1606 are formed along a portion of the stem 1604 that engages with the alignment plate **460*b*. The grooves 1606 may permit additional fluid flow around the stem 1604 when the valve is opened. The grooves 1606 can improve the manufacturability of the stem 1604 as compared with inner cylinders 502*b* and 582*b* of cages 502 and 582** respectively.

Figure 13:
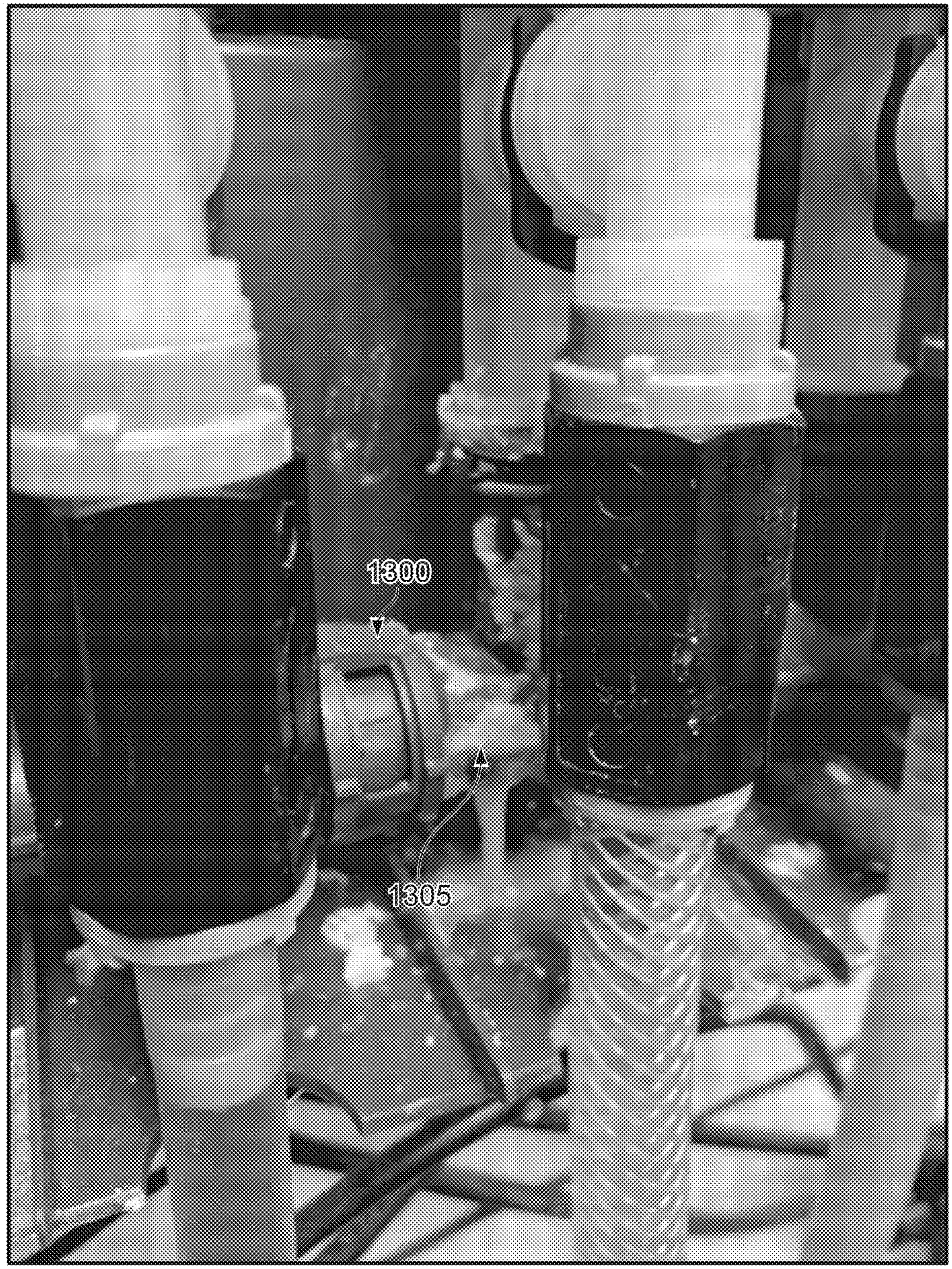
FIGS. 13 and 14 depict residue build up and scale produced on conventional dispenser flush manifolds without the use of a manifold flood valve assembly.
Figure 14:
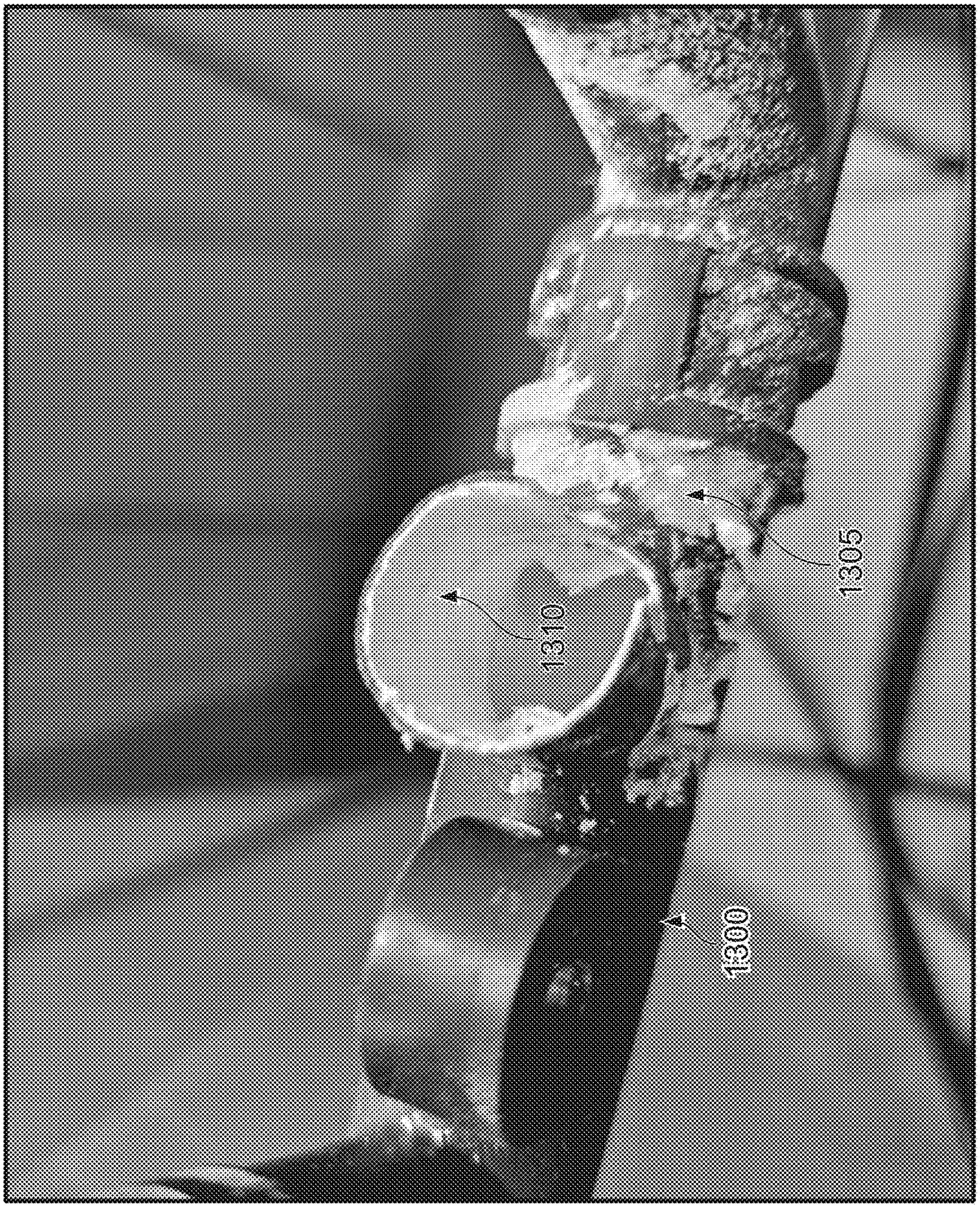

FIG. 13 is a photograph showing crystallization residue 1305 built up on the outside of piping surfaces of a dispenser flush manifold 1300 that does not include an MFVA to maintain the flush manifold in a flooded state. FIG. 14 is a photograph showing crystallization residue 1305, 1310 built up on both the inside and outside of piping of the flush manifold 1300 from a chemical dispenser that does not include an MFVA to maintain the flush manifold in a flooded state. The residue build-up on the inside and outside of the flush manifold may be a particular problem in dispensing systems that have a vent or air gaped component upstream of (or in other fluid communication with) the flush manifold. Such may be the case with dispensing systems that employ eductors.

Figure 15:
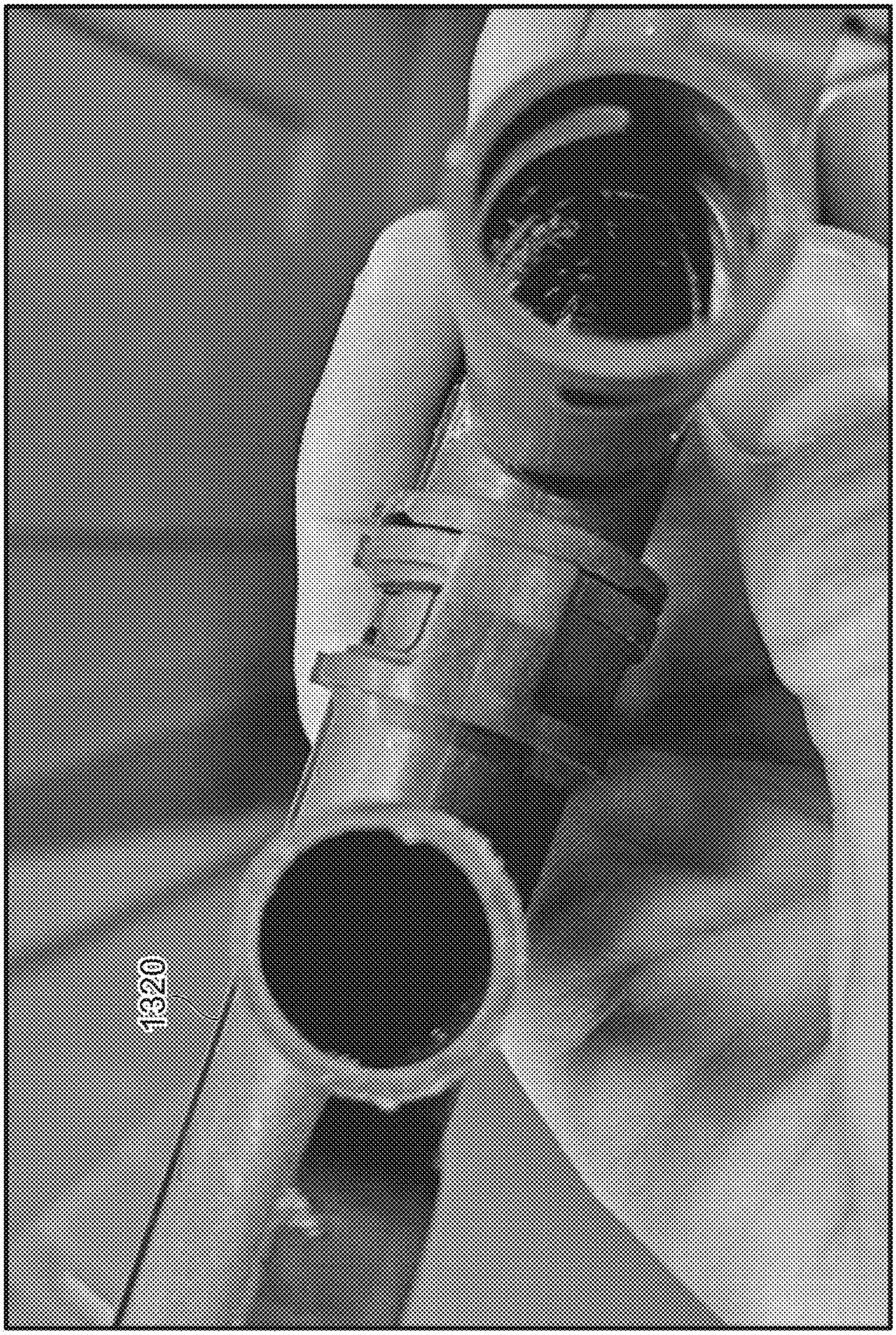
FIG. 15 depicts a flush manifold after extended use with a manifold flood valve assembly.
Figure 16A:
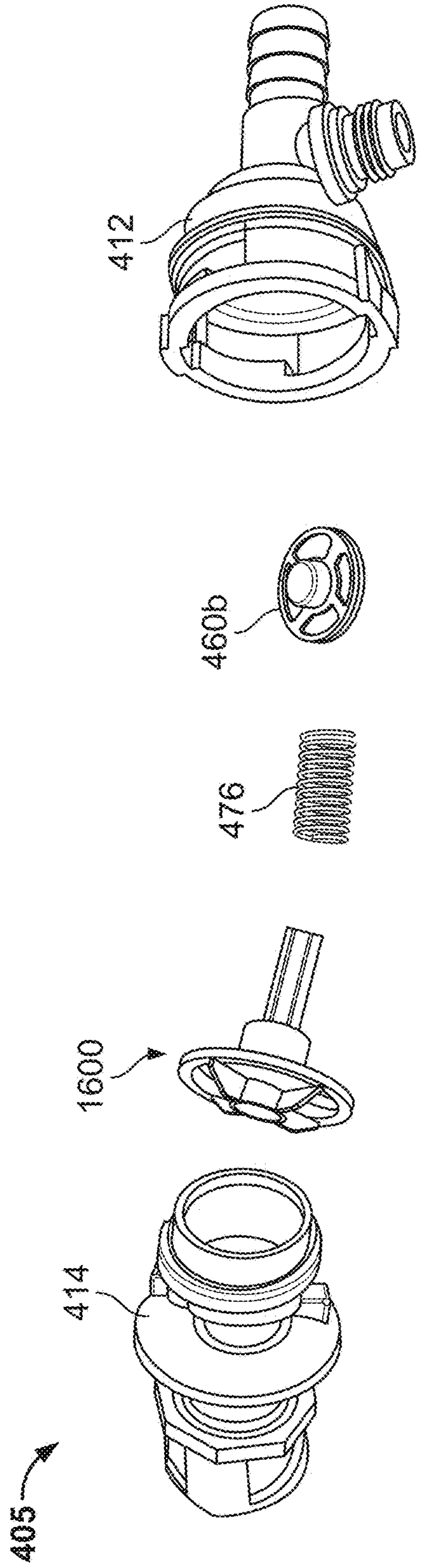
FIG. 16A depicts an exploded view of a fourth exemplary implementation of a manifold flood valve.
Figure 16C:
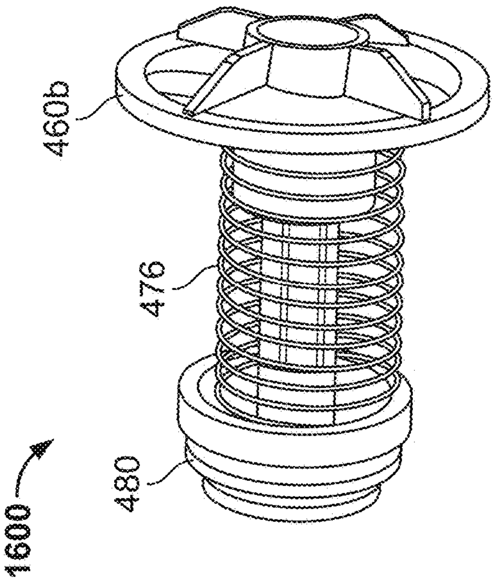
FIGS. 16B and 16C depict detailed views of the plug assembly and alignment plate of the manifold flood valve assembly of FIG. 16A.
Figure 16B:
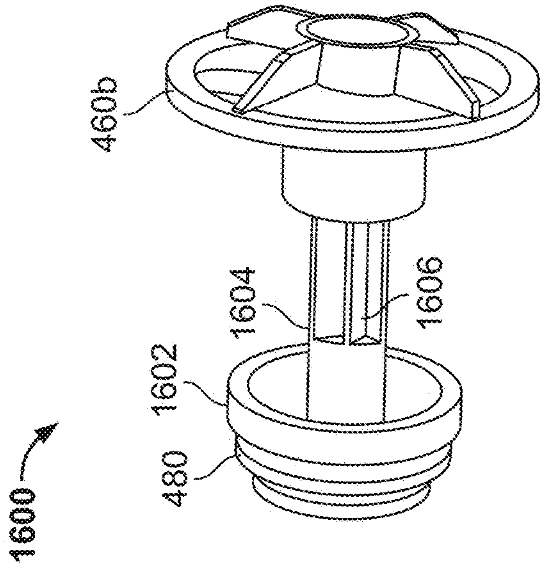
Figure 16D:
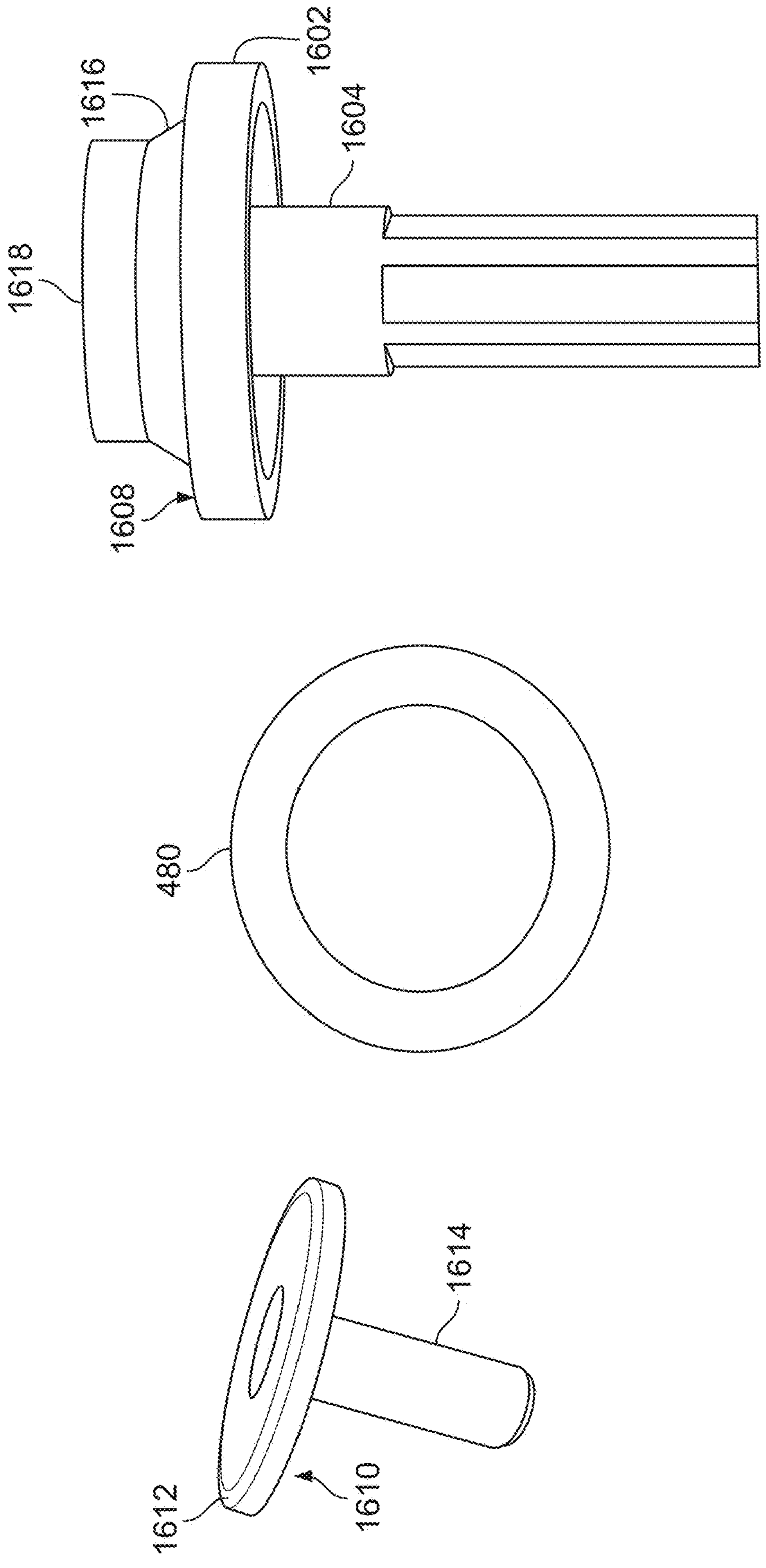
FIG. 16D depicts a detailed view of the plug assembly components.

FIG. 15 depicts a flush manifold 1320 after extended use with an MFVA. In contrast to the photographs shown in FIGS. 13 and 14, the flush manifold 1320 does not have significant residue build-up on the inside or the outside of the flush manifold 1320. The inclusion of an MFVA in the dispenser system maintains the flush manifold in a flooded state thereby reducing residue build-up caused by interactions between chemical solutions and ambient air.

As used herein, the terms "orthogonal" or "substantially orthogonal" refer to a relation between two elements (e.g., lines, axes, planes, surfaces, or components) that forms a ninety degree (perpendicular) angle within acceptable engineering, machining, or measurement tolerances. For example, two surfaces can be considered orthogonal to each other if the angle between the surfaces is within an acceptable tolerance of ninety degrees (e.g., ±1-2 degrees).

As used herein, the terms "aligned," "substantially aligned," "parallel," or "substantially parallel" refer to a relation between two elements (e.g., lines, axes, planes, surfaces, or components) as being oriented generally along the same direction within acceptable engineering, machining, drawing measurement, or part size tolerances such that the elements do not intersect or intersect at a minimal angle. For example, two surfaces can be considered aligned with each other if surfaces extend along the same general direction of a device.

While a number of examples have been described for illustration purposes, the foregoing description is not intended to limit the scope of the invention, which is defined by the scope of the appended claims. There are and will be other examples and modifications within the scope of the following claims.

What is claimed is:

1. A dispensing system comprising:

a flush manifold comprising a plurality of intake ports and an outlet port;

an eductor comprising:

an inlet port fluidically coupled to a source of a diluent, a pickup port fluidically coupled to a source of a chemical product, a discharge port fluidically coupled to an intake port of the flush manifold and configured to discharge a chemical solution, and a venturi fluidically coupled to each of the inlet port, the pickup port, and the discharge port, the venturi being configured to draw the chemical product into the eductor in response to the diluent being coupled to the inlet port such that the chemical product is mixed with the diluent to form the chemical solution;

a check valve fluidically coupled to the outlet port of the flush manifold and arranged to maintain the flush manifold substantially full of fluid between dispensing operations; and a vent valve fluidically coupled to an outlet of the check valve.

2. The dispensing system of claim 1, wherein the check valve is a first check valve and wherein the vent valve comprises a second check valve arranged to permit ambient airflow into the dispensing system downstream of the first check valve.

3. The dispensing system of claim 2, wherein the second check valve comprises an umbrella valve or a ball check valve.

4. The dispensing system of claim 1, wherein the check valve comprises:

a plug assembly;

a valve plate; and a spring positioned between the plug assembly and the valve plate, wherein the plug assembly is free to move linearly along a central axis of the check valve against a force of the spring.

5. The dispensing system of claim 4, wherein the valve plate comprises a central opening surrounded by an annular wall, the annular wall serving to retain the spring in a position along the central axis.

6. The dispensing system of claim 5, wherein the valve plate comprises a plurality of apertures arranged circumferentially around the valve plate and radially outward of the annular wall.

7. The dispensing system of claim 6, wherein the apertures comprise an elongated shape.

8. The dispensing system of claim 4, wherein the plug assembly comprises:

a cage comprising an outer cylinder connected to an inner cylinder by a front face, wherein the inner cylinder surrounds a central aperture defined in the front face;

a plug comprising a stem extending from a rear surface of the plug, wherein the stem extends through the central aperture of the front face and into the inner cylinder of the cage; and an O-ring captured between the plug and the cage.

9. The dispensing system of claim 8, wherein the spring is positioned against the front face of the cage and the outer cylinder at least partially surrounds the spring and the spring at least partially surrounds the inner cylinder.

10. The dispensing system of claim 8, wherein the outer cylinder comprises a plurality of apertures.

11. The dispensing system of claim 8, wherein the inner cylinder extends through a central aperture of the valve plate with the check valve in a closed position.

12. The dispensing system of claim 8, wherein the inner cylinder extends through a central aperture of the valve plate with the check valve in an open position.

13. The dispensing system of claim 4, wherein the plug assembly comprises:

a plug comprising:

a plug body with two planar surfaces opposite one another with a groove formed between the planar surfaces;

a stem extending from the plug body, and an o-ring captured within the groove.

14. The dispensing system of claim 4, wherein the check valve comprises:

a first body portion forming a check valve inlet; and a second body portion coupled to the first body portion, the second body portion forming a check valve outlet, wherein the valve plate is secured between a shoulder region of the second body portion and a plate seat of the first body portion.

15. The dispensing system of claim 14, wherein the second body portion comprises a connection port and the vent valve is coupled to the connection port.

16. The dispensing system of claim 14, wherein the plug assembly is housed within the first body portion.

17. A dispensing system comprising:

an inlet manifold comprising an inlet port and a plurality of outlet ports wherein the inlet port of the inlet manifold is fluidically coupled to a source of a diluent;

a flush manifold comprising a plurality of intake ports and an outlet port;

a plurality of eductors, each eductor comprising an inlet port, a pickup port, a discharge port, and a venturi fluidically coupled to each of the inlet port, the pickup port, and the discharge port, wherein the inlet port of each eductor is fluidically coupled to an outlet port of the inlet manifold, the pickup port of each eductor is fluidically coupled to a source of a chemical product, and the discharge port of each eductor is fluidically coupled to an intake port of the flush manifold;

a check valve fluidically coupled to the outlet port of the flush manifold and arranged to maintain the flush manifold substantially full of fluid between dispensing operations; and a vent valve fluidically coupled to an outlet of the check valve.

18. The dispensing system of claim 17, wherein the check valve is a first check valve and the vent valve comprises a second check valve arranged to permit ambient airflow into the dispensing system downstream of the first check valve.

19. The dispensing system of claim 17, wherein the check valve comprises:

a plug assembly;

a valve plate; and a spring positioned between the plug assembly and the valve plate, wherein the plug assembly is free to move linearly along a central axis of the check valve against a force of the spring.

20. A dispensing system comprising:

a flush manifold comprising a plurality of intake ports and an outlet port;

an eductor comprising:

an inlet port fluidically coupled to a source of a diluent, a pickup port fluidically coupled to a source of a chemical product, a discharge port fluidically coupled to an intake port of the flush manifold and configured to discharge a chemical solution, and a venturi fluidically coupled to each of the inlet port, the pickup port, and the discharge port, the venturi being configured to draw the chemical product into the eductor in response to the diluent being coupled to the inlet port such that the chemical product is mixed with the diluent to form the chemical solution;

a check valve fluidically coupled to the outlet port of the flush manifold and arranged to maintain the flush manifold substantially full of fluid between dispensing operations; and a vent valve fluidically coupled to an outlet of the check valve, wherein the check valve comprises:

a first body portion forming a check valve inlet; and a second body portion coupled to the first body portion, the second body portion forming a check valve outlet;

a plug assembly housed within the first body portion, the plug assembly comprising:

a plug comprising:

a plug body with two planar surfaces opposite one another with a groove formed between the planar surfaces;

a stem extending from the plug body, and an O-ring captured within the groove;

a valve plate secured between the second body portion and the first body portion, the valve plate comprising:

a central opening surrounded by an annular wall, wherein the stem of the plug extends through the central opening, and a plurality of apertures arranged circumferentially around the valve plate and radially outward of the annular wall; and a spring positioned between the plug assembly and the valve plate, wherein the plug assembly is free to move linearly along a central axis of the check valve against a force of the spring.

* * * * *